United States Patent
Kurabayashi

(10) Patent No.: US 12,257,498 B2
(45) Date of Patent: Mar. 25, 2025

(54) SERVER, PROCESSING SYSTEM, PROCESSING METHOD, AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 164 days.

(21) Appl. No.: 17/836,324

(22) Filed: Jun. 9, 2022

(65) Prior Publication Data

US 2022/0297001 A1    Sep. 22, 2022

Related U.S. Application Data

(63) Continuation of application No. PCT/JP2020/045411, filed on Dec. 7, 2020.

(30) Foreign Application Priority Data

Dec. 10, 2019    (JP) .................................. 2019-222683

(51) Int. Cl.
*A63F 13/358*    (2014.01)
*A63F 13/2145*    (2014.01)
(Continued)

(52) U.S. Cl.
CPC ........ *A63F 13/358* (2014.09); *A63F 13/2145* (2014.09); *A63F 13/42* (2014.09);
(Continued)

(58) Field of Classification Search
None
See application file for complete search history.

(56) References Cited

U.S. PATENT DOCUMENTS

| 8,734,258 B2* | 5/2014 | Gutmann ............... A63F 13/69 |
|---|---|---|
| | | 463/42 |
| 9,550,112 B2* | 1/2017 | Gutmann ............... A63F 13/35 |
| (Continued) | | |

FOREIGN PATENT DOCUMENTS

| JP | 6389581 B1 | 9/2018 |
|---|---|---|
| JP | 6438612 B1 | 12/2018 |
| (Continued) | | |

OTHER PUBLICATIONS

International Search Report issued in PCT/JP2020/045411 on Jan. 19, 2021 (3 pages).
(Continued)

*Primary Examiner* — Seng H Lim
(74) *Attorney, Agent, or Firm* — Osha Bergman Watanabe & Burton LLP

(57) ABSTRACT

The present invention provides a player terminal including: a storage unit for storing a state value corresponding to each of a plurality of operated objects; an acceptance unit for accepting a player input; an estimation unit that produces an estimation result corresponding to a second timing, which is later than a first timing, on the basis of an estimation model for producing an estimation result of the per-timing information; a determination unit for determining whether the content of the player input accepted in such a manner as to correspond to the second timing coincides with estimation content of the player input; a correction information transmission unit that transmits correction information indicating the content of the accepted player input; a correction information acquisition unit for acquiring the correction information transmitted by another player terminal; and a compensation unit for compensating for the estimation result on the basis of the correction information.

16 Claims, 16 Drawing Sheets

(51) Int. Cl.
  *A63F 13/42* (2014.01)
  *A63F 13/44* (2014.01)
  *A63F 13/69* (2014.01)
  *G06N 20/00* (2019.01)

(52) U.S. Cl.
  CPC .............. *A63F 13/44* (2014.09); *A63F 13/69* (2014.09); *G06N 20/00* (2019.01)

(56) References Cited

U.S. PATENT DOCUMENTS

| | | | |
|---|---|---|---|
| 10,599,256 B2* | 3/2020 | Kurabayashi | G06F 3/0416 |
| 11,331,580 B2* | 5/2022 | Kurabayashi | A63F 13/67 |
| 11,717,748 B2* | 8/2023 | Bleasdale-Shepherd | G06N 20/00 463/31 |
| 2010/0325255 A1 | 12/2010 | Cheung et al. | |
| 2013/0154974 A1* | 6/2013 | Murata | A63F 13/92 345/173 |
| 2014/0365412 A1* | 12/2014 | Mizrachi | A63F 13/422 706/14 |
| 2018/0157372 A1* | 6/2018 | Kurabayashi | G06F 3/04886 |
| 2021/0001231 A1 | 1/2021 | Kurabayashi | |
| 2021/0052984 A1 | 2/2021 | Kurabayashi | |
| 2021/0146241 A1* | 5/2021 | Bleasdale-Shepherd | H04L 67/131 |

FOREIGN PATENT DOCUMENTS

| | | |
|---|---|---|
| WO | 98/14898 A2 | 4/1998 |
| WO | 2008/126701 A1 | 10/2008 |

OTHER PUBLICATIONS

Written Opinion of the International Searching Authority issued in PCT/JP2020/045411 on Jan. 19, 2021 (3 pages).

"[CEDEC 2010] What's Happening Behind the Scenes of Net Games? A Network Engineer's Perspective on the Key Principles of Game Design", [online], Sep. 6, 2010, [retrieved Jul. 4, 2019], Internet <URL: https://www.4gamer.net/games/105/G010549/20100905002/> (16 pages).

SoftwareDesign, Apr. 18, 2011, pp. 50-59, (LEE,H.K.), non-official translation (Netoge, stock trading. Think about delays that can't be excused with "I'm sorry") (16 pages).

Smed, J., Oct. 25, 2007, pp. 164-167, (Algorithms and Networking for Computer Game, first edition, Born Digital, Inc., Ishibashi, Toshio) (6 pages).

* cited by examiner

FIG. 6A    WORLD COORDINATES
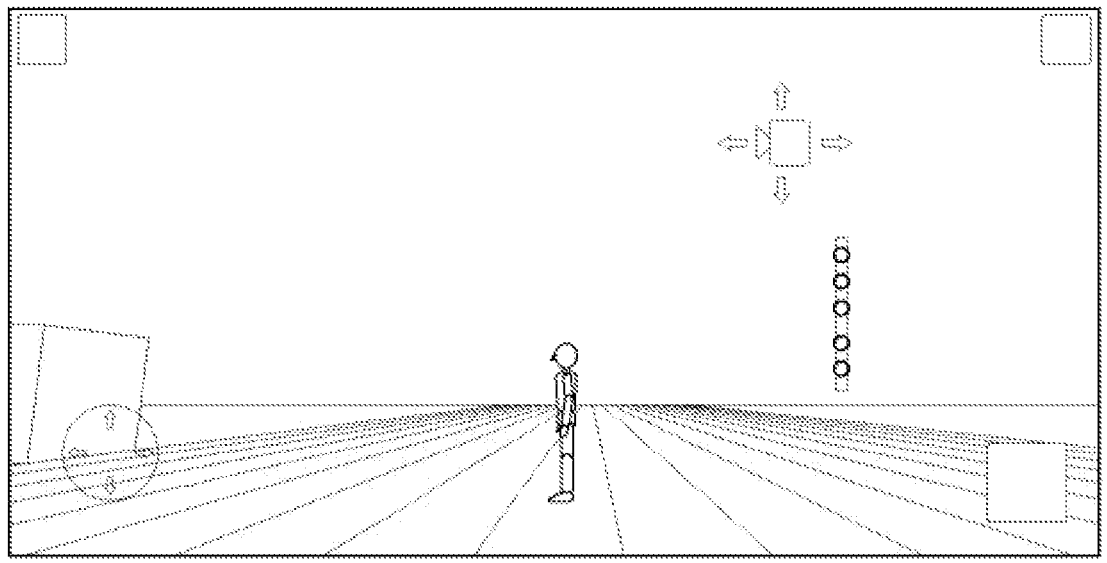
FIG. 6B    LOCAL COORDINATES
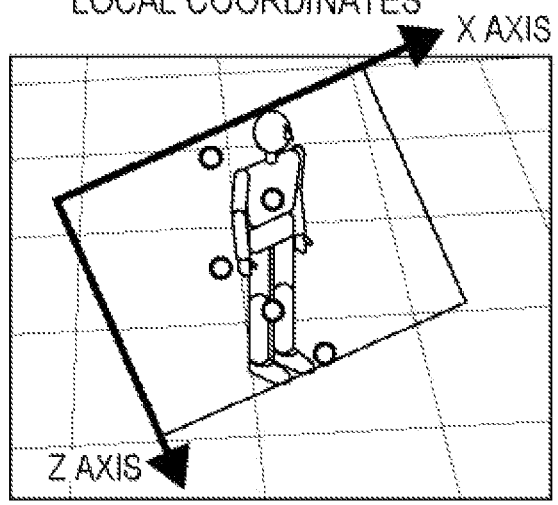

FIG. 10B
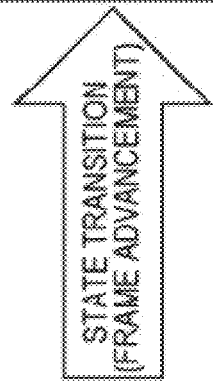
STATE TRANSITION (FRAME ADVANCEMENT)
FIG. 10A
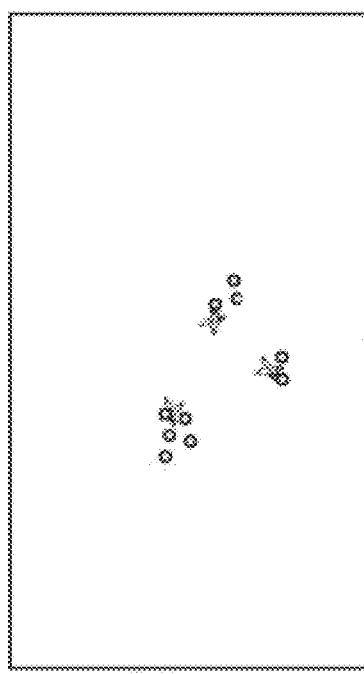
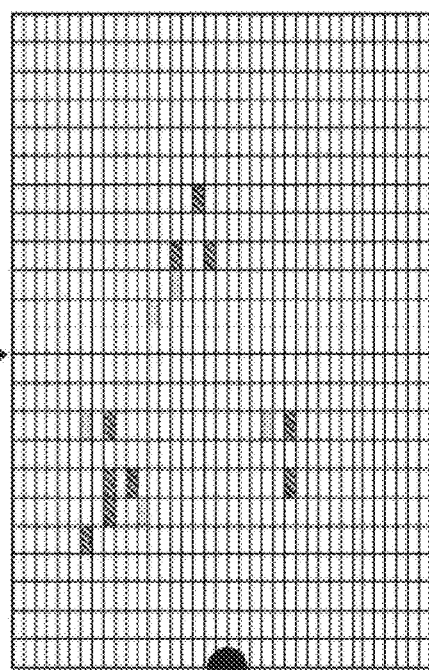
DATA IS EXPRESSED AS MATRIX ACCORDING TO POSITIONS OF POINT GROUPS
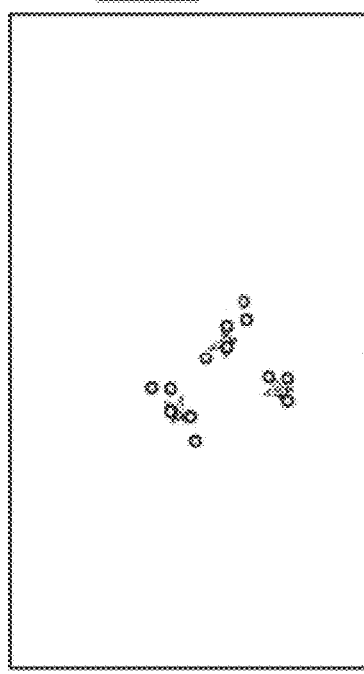
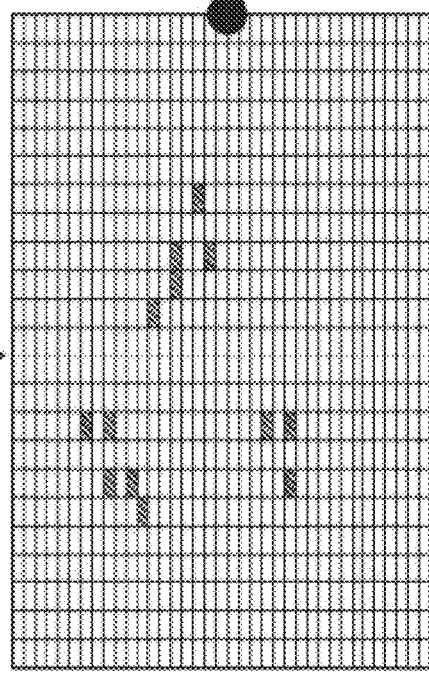
DATA IS EXPRESSED AS MATRIX ACCORDING TO POSITIONS OF POINT GROUPS
THIS PAIR OF NEIGHBORING FRAMES ARE LEARNED AS DATA BEFORE AND AFTER PATTERN GENERATION

FIG. 12

| OPERATED OBJECT ID | STATE VALUES | | |
|---|---|---|---|
| | COORDINATES | H.P. | ... |
| A00138 | (···, ···) | 321 | ... |
| ⋮ | ⋮ | ⋮ | ⋮ |

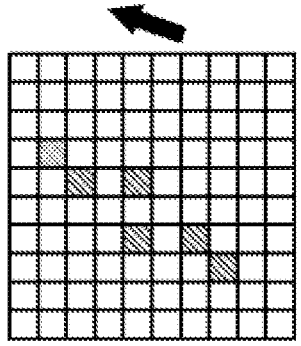
FIG. 15A REFERENCE CNN WINDOW SIZE
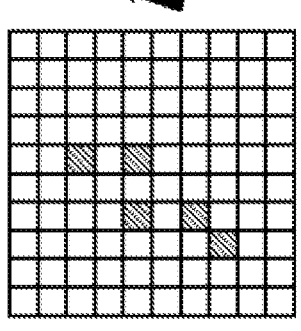
FIG. 15B EXPRESSION IN THE FORM OF POINT GROUP (1)
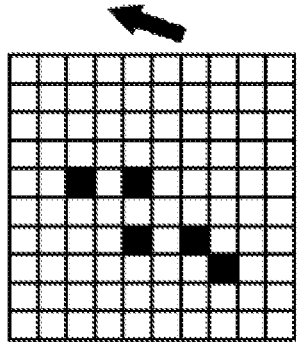
FIG. 15C EXPRESSION IN THE FORM OF POINT GROUP (2)
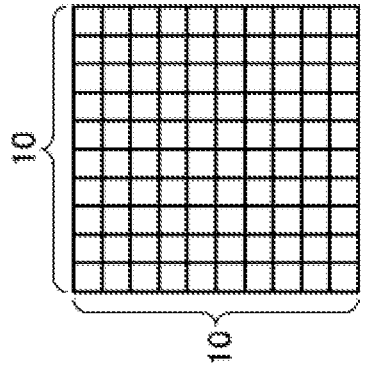
FIG. 15D EXPRESSION IN THE FORM OF POINT GROUP (3)

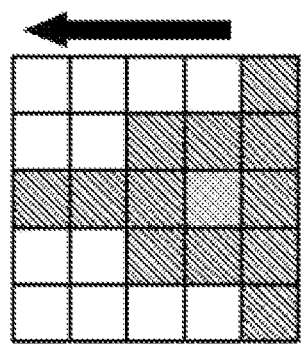
FIG. 16A  REFERENCE CNN WINDOW SIZE
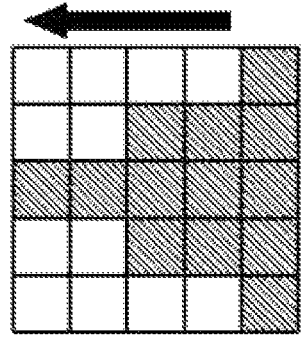
FIG. 16B  EXPRESSION IN THE FORM OF BITMAP (1)
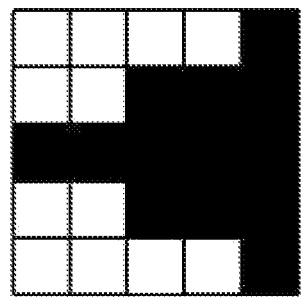
FIG. 16C  EXPRESSION IN THE FORM OF BITMAP (2)
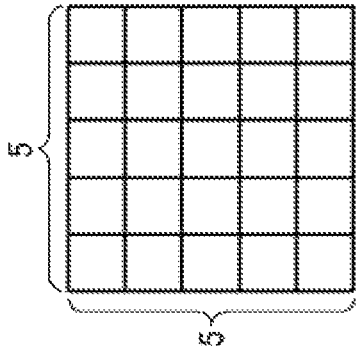
FIG. 16D  EXPRESSION IN THE FORM OF BITMAP (3)

SERVER, PROCESSING SYSTEM, PROCESSING METHOD, AND PROGRAM

TECHNICAL FIELD

The present invention relates to servers, processing systems, processing methods, and programs.

BACKGROUND ART

Communication protocols have generally been improved such that the efficiency is enhanced by reducing intermediate layers of the protocol stack. Although such a method is universally applicable and highly effective, it is difficult to dramatically increase the speed and decrease the latency by tens of percent or more. In addition, although TCP/IP parameter optimization specific to a particular application, such as the Web, is widely employed, parameter optimization cannot lead to end-to-end optimization. For this reason, it has not been possible to design gameplay that depends on parameter optimization.

Meanwhile, in games such as MMO (Massively Multiplayer Online) games and FPS (First Person Shooter) games, delta compression is widely used. In delta compression, current data is not transmitted if it is not changed from the preceding data that has been transmitted. This delta compression is effective for transmitting and receiving data the value of which is not frequently changed, such as status data. However, this delta compression is not effective as a compression technique for communicating data, such as data about the current position of a character, that is subjected to such frequent changes in value as to require constant transmission and reception of differential information. For this reason, it has been a challenge in games to improve the efficiency of transmitting and receiving data the values of which change frequently, such as data about the position of a character.

One technique that addresses this issue is a method for specifying/predicting the destination of a character's movement. With this technique, the destination (position information) of a character's movement in the next frame is specified directly by a player himself/herself or is predicted/complemented by linear complement or the like. This technique reduces the amount of communication compared to continuously transmitting and receiving the content (movement direction, etc.) of the player's input. For example, NPL 1 discloses methods for reducing latency, such as a method in which the gameplay is changed such that a movement destination, instead of a movement direction, is specified in moving a character and a method in which, while predicted coordinates are calculated and transmitted to the server at the start of moving a character, the coordinates are compensated for (warped) if the predicted coordinates are incorrect. These are techniques generally called Lerp (linear interpolation).

Note that a technique related to the present invention is disclosed in PTL 1. PTL 1 discloses a technique for storing a data point group indicating a plurality of touch positions at the screen coordinates detected on a touchscreen within a predetermined time period, determining, from the data point group, the slope of a regression line and the amount of rotation by which the slope of the regression line is rotated, and determining control content of an operated object (character) on the basis of the slope and the amount of rotation of the regression line.

CITATION LIST

Patent Literature

{PTL 1}
Publication of Japanese Patent No. 6389581

Non Patent Literature

{NPL 1}
"[CEDEC 2010] What's Happening Behind the Scenes of Net Games? A Network Engineer's Perspective on the Key Principles of Game Design", [online], Sep. 6, 2010, [retrieved Jul. 4, 2019], Internet <URL: https://www.4gamer.net/games/105/G010549/20100905002/>

SUMMARY OF INVENTION

Technical Problem

Although effective for less action-oriented MMO games, Lerp adversely affects the gameplay in more action-oriented MMO games, which require precise positioning. In addition, the method for compensating for prediction results by warping also has a problem in that motions are discontinuous and non-smooth as viewed from another player. Thus, Lerp, although capable of alleviating the problem of communication delay, could adversely affect gameplay.

The present invention addresses the challenge of providing a technique for alleviating the problem of communication delay while still suppressing adverse effects on gameplay.

Solution to Problem

The present invention provides a program for causing a computer in each of a plurality of player terminals that establish data communication with each other directly or via a server to function as:

a storage unit for storing a state value corresponding to each of a plurality of operated objects;

an acceptance unit for accepting a player input;

an estimation unit that produces an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;

a determination unit for determining whether or not the content of the player input accepted by the acceptance unit in such a manner as to correspond to the second timing coincides with estimation content of the player input that is indicated by the estimation result and that corresponds to the second timing;

a correction information transmission unit that, if a determination result produced by the determination unit indicates non-coincidence, transmits, to an external device, correction information indicating the content of the player input accepted by the acceptance unit;

a correction information acquisition unit for acquiring the correction information transmitted by another player terminal;

a compensation unit for compensating for the estimation result on the basis of the correction information; and an update unit for updating the state value of the operated object on the basis of the estimation result.

In addition, the present invention provides a server having:

a tensor data generation unit that generates, at intervals of a predetermined time period, matrix data indicating a state of a world coordinate system in which a data point group indicating touch positions at screen coordinates detected on a touchscreen of each of a plurality of player terminals in such a manner as to correspond to each of a plurality of timings at intervals of the predetermined time period is associated with and mapped to the position of each operated object and that generates tensor data storing the matrix data along a time axis;

a learning data generation unit for extracting, from the tensor data, learning data in which the matrix data corresponding to an N-th timing is associated with the matrix data corresponding to a timing after the N-th timing; and an estimation model generation unit for generating, through machine learning based on the learning data, an estimation model for producing, from the matrix data corresponding to a certain timing, an estimation result of the matrix data corresponding to a subsequent timing.

In addition, the present invention provides a processing method including causing a computer in each of a plurality of player terminals that establish data communication with each other directly or via a server to:

store a state value corresponding to each of a plurality of operated objects;

accept a player input;

produce an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;

determine whether or not the content of the player input accepted in such a manner as to correspond to the second timing coincides with estimation content of the player input that is indicated by the estimation result and that corresponds to the second timing;

transmit, to an external device, correction information indicating the content of the accepted player input if a determination result indicates non-coincidence;

acquire the correction information transmitted by another player terminal;

compensate for the estimation result on the basis of the correction information; and update the state value of the operated object on the basis of the estimation result.

In addition, the present invention provides a processing system having a plurality of player terminals and a server, wherein each of the player terminals has:

a storage unit for storing a state value corresponding to each of a plurality of operated objects;

an acceptance unit for accepting a player input;

an estimation unit that produces an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;

a determination unit for determining whether or not the content of the player input accepted by the acceptance unit in such a manner as to correspond to the second timing coincides with estimation content of the player input that is indicated by the estimation result and that corresponds to the second timing;

a correction information transmission unit that, if a determination result produced by the determination unit indicates non-coincidence, transmits, to an external device, correction information indicating the content of the player input accepted by the acceptance unit;

a correction information acquisition unit for acquiring the correction information transmitted by another player terminal;

a compensation unit for compensating for the estimation result on the basis of the correction information; and an update unit for updating the state value of the operated object on the basis of the estimation result, and the server has a transmission unit that, upon receiving the correction information from a player terminal, transmits the received correction information to the other player terminals.

Advantageous Effects of Invention

According to the present invention, a technique for alleviating the problem of communication delay while still suppressing adverse effect on gameplay is realized.

BRIEF DESCRIPTION OF DRAWINGS

FIGS. 6A and 6B include diagrams for illustrating processing according to this embodiment.

FIGS. 10A and 10B include diagrams for illustrating processing according to this embodiment.

FIG. 12 is a diagram schematically showing an example of information processed by the player terminal according to this embodiment.

FIGS. 15A, 15B, 15C, and 15D include diagrams for illustrating processing according to this embodiment.

FIGS. 16A, 16B, 16C, and 16D include diagrams for illustrating processing according to this embodiment.

DESCRIPTION OF EMBODIMENTS

Outline of Game System

Figure 1:
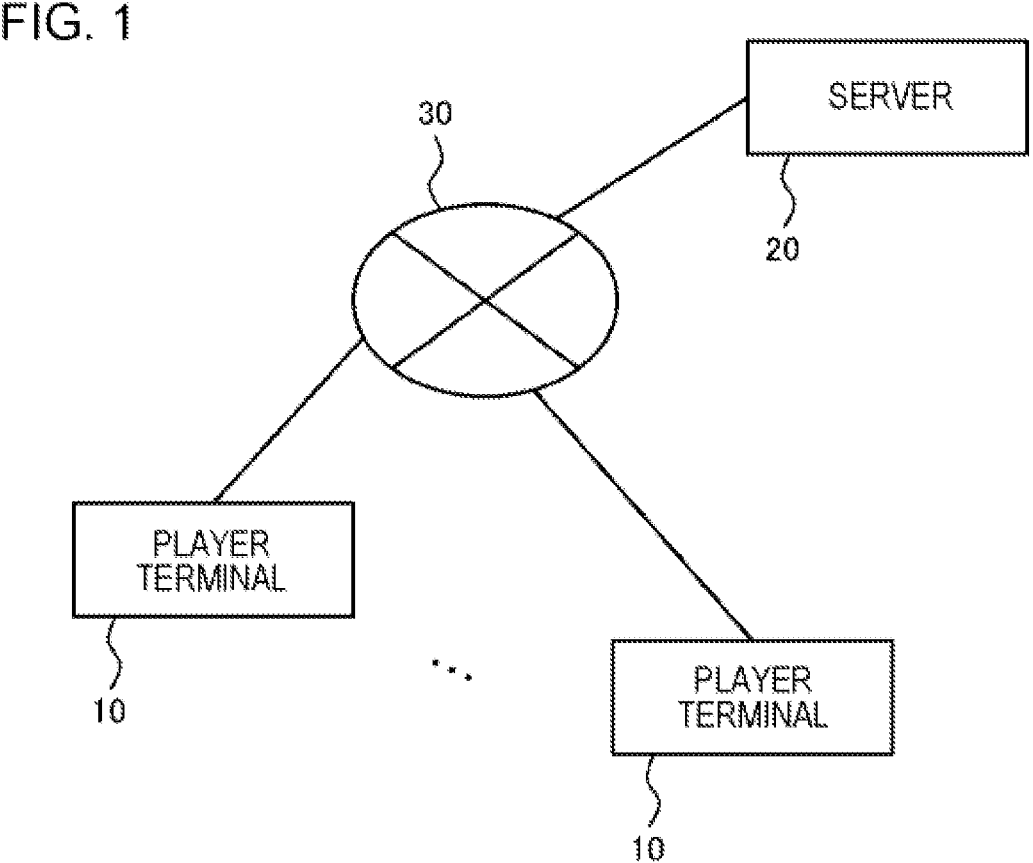
FIG. 1 is an example of the functional block diagram of a game system according to this embodiment.

First, the outline of a game system according to this embodiment will be described. As shown in FIG. 1, the game system according to this embodiment has a plurality of player terminals 10 and a server 20. The player terminals 10 and the server 20 are connected to each other via a communication network 30. The player terminals 10 are terminals operated by respective players and are typified by, but are not limited to, smartphones, tablet terminals, mobile phones, personal computers, or the like. The plurality of player terminals 10 can establish data communication with each other directly or via the server 20. The game system according to this embodiment is suitable for, for example, MMO games.

In this embodiment, an estimation model for estimating input content that will be input by a typical player in the very near future (e.g., one to ten-odd frames ahead) is generated by applying deep learning to game logs, which are accumulated in large amounts in MMO games, etc. Then, each of the plurality of player terminals 10 estimates the future input content that will be input by each of the plurality of players on the basis of the same estimation model. Naturally, the estimation results produced by the plurality of player terminals 10 have the same content.

Then, if the content actually input by a player to his/her own terminal differs from the estimation result, the player terminal 10 transmits, to the other player terminals 10 directly or through the server 20, the content actually input by the player to his/her own terminal (estimation-result correcting information). If the content actually input by a player to his/her own terminal is the same as the estimation result, the player terminal 10 does not transmit, to the other player terminals 10, the content actually input by the player to his/her own terminal.

Each of the player terminals 10, if having received the estimation-result correcting information transmitted by another player terminal 10, controls (moves, etc.) a character to be controlled by the player terminal 10 on the basis of the received information and, if having not received the estimation-result correcting information, controls the character on the basis of the estimation result.

In this manner, the game system according to this embodiment makes a "synchronous prediction", in which the plurality of player terminals 10 simultaneously estimate, on the basis of the same estimation model, future input content that will be input by each of the plurality of players. Then, only when a player has input content different from the prediction result to his/her own player terminal 10, the other player terminals 10 are notified of the input content. The game system according to this embodiment realizes a multiplay communication method featuring high efficiency, low delay, and high resistance to packet loss.

Hardware Configurations

Next, the hardware configurations of a player terminal 10 and the server 20 will be described.

"Player Terminal 10"

Figure 2:
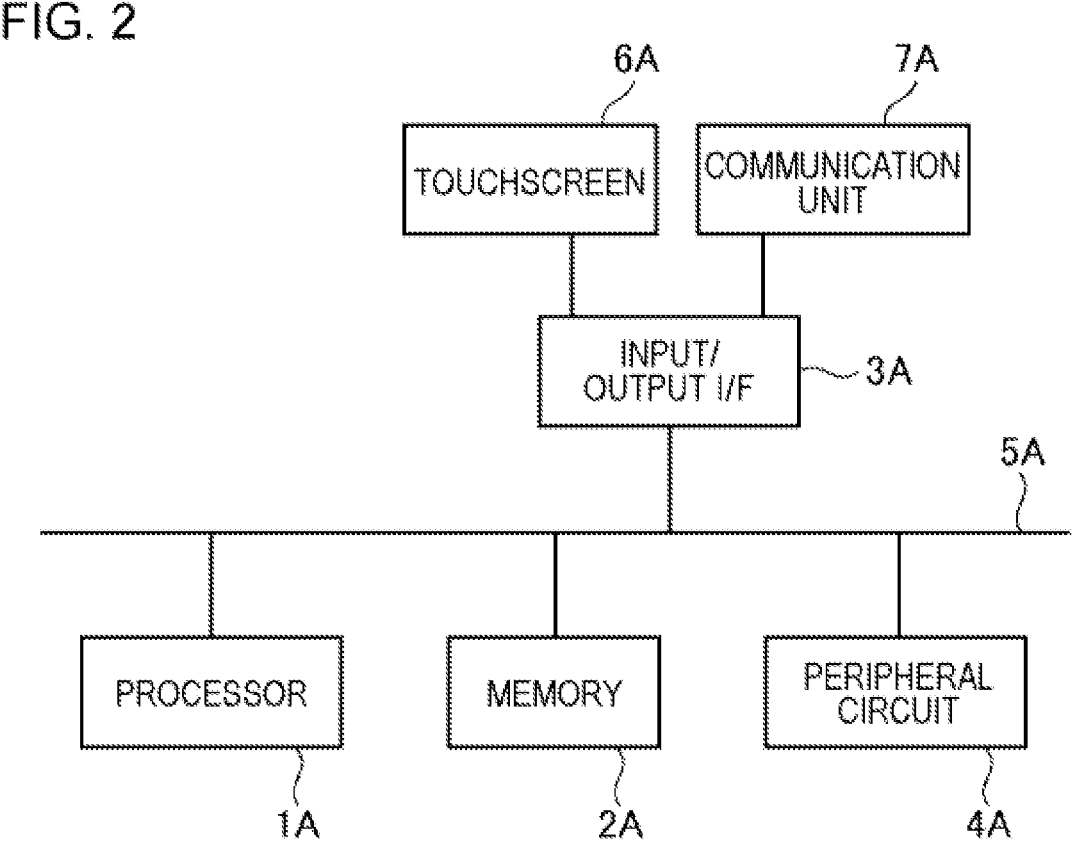
FIG. 2 is a diagram showing an example of the hardware configuration of a player terminal according to this embodiment.

First, the hardware configuration of the player terminal 10 will be described. FIG. 2 is a block diagram for illustrating the hardware configuration of the player terminal 10. As shown in FIG. 2, the player terminal 10 has: a processor 1A; a memory 2A; an input/output interface 3A; a peripheral circuit 4A; a bus 5A; a touchscreen 6A; and a communication unit 7A. The peripheral circuit 4A includes various modules. Note that the peripheral circuit 4A need not be provided.

The functional units provided in the player terminal 10 are realized by an arbitrary combination of: hardware, such as the processor 1A, the memory 2A, the input/output I/F 3A, and modules (touchscreen 6A, communication unit 7A, etc.) connected to the input/output I/F 3A; and programs (software) that are stored in built-in memories (ROM, hard disk, etc.) and that are loaded into a RAM or the like. Furthermore, it will be understood by a person skilled in the art that there can be various modifications of the methods and devices for realizing the functional units. Note that the programs stored in the built-in memories include not only programs prestored at the time the processing device is shipped but also programs, etc. downloaded from a server or the like on the Internet.

The bus 5A is a data transmission path that allows the processor 1A, the memory 2A, the peripheral circuit 4A, and the input/output I/F (interface) 3A to transmit/receive data to/from each other. The processor 1A is a computational processing device, such as a CPU (Central Processing Unit), a GPU (Graphics Processing Unit), or an NPU (Neural network Processing Unit). The memory 2A is a memory such as a RAM (Random Access Memory) or a ROM (Read Only Memory). An input device (the touchscreen 6A, a microphone, a physical button, or the like), an output device (the touchscreen 6A, a speaker, or the like), and a communication unit 7A for connecting to a network such as the Internet are connected to the input/output I/F 3A. The processor 1A is capable of issuing instructions to the individual modules and performing computations on the basis of the computation results from the modules.

Note that the touchscreen 6A is constituted of a display that displays an image and a position input sensor. When a touch operation is performed on the touchscreen 6A, the position input sensor outputs a signal (detection result) based on the touched position. The signal output from the touchscreen 6A is input to the processor 1A via the input/output I/F 3A. The processor 1A executes a program for converting the signal output from the touchscreen 6A into coordinates in an arbitrary coordinate system, thereby converting the signal output from the touchscreen 6A into coordinates in that coordinate system. The above-described coordinate system is, for example, a coordinate system that has an origin at an arbitrary point on the touched surface of the touchscreen 6A and that has an X axis and a Y axis defined in arbitrary directions parallel to the surface. Hereinafter, the coordinates in this coordinate system will be referred to as "screen coordinates" for the sake of convenience. Examples of the position input sensor include capacitive sensors and resistive sensors.

Here, a touch operation refers to: an operation for bringing an object (a finger or the like) into contact with or into proximity to the position input sensor to allow the position input sensor to detect the object being brought into contact therewith or into proximity thereto; an operation for changing the position at which the object is in contact with or in proximity to the position input sensor while maintaining the object in contact with or in proximity to the position input sensor; and an operation for moving the object away from the position input sensor to cause the position input sensor to quit detection.

"Server 20"

Figure 3:
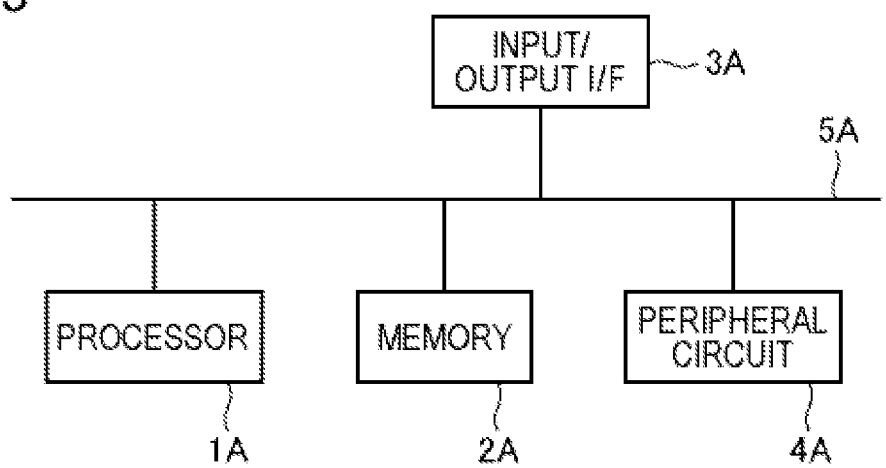
FIG. 3 is a diagram showing an example of the hardware configuration of a server according to this embodiment.

Next, the hardware configuration of the server 20 will be described. FIG. 3 a block diagram for illustrating the hardware configuration of the server 20. As shown in FIG. 3, the server 20 has: a processor 1A; a memory 2A; an input/output interface 3A; a peripheral circuit 4A; a bus 5A, etc. The peripheral circuit 4A includes various modules. Note that the peripheral circuit 4A need not be provided.

The functional units provided in the server 20 are realized by an arbitrary combination of: hardware, such as the processor 1A, the memory 2A, the input/output I/F 3A, and modules connected to the input/output I/F 3A; and programs (software) that are stored in built-in memories (ROM, hard disk, etc.) and that are loaded into a RAM or the like. Furthermore, it will be understood by a person skilled in the art that there are various modifications of the methods and devices for realizing the functional units. Note that the programs stored in the built-in memories include not only programs prestored at the time the processing device is shipped but also programs, etc. downloaded from a server or the like on the Internet. Because the processor 1A, the memory 2A, the input/output interface 3A, the peripheral circuit 4A, and the bus 5A have been described in detail above, descriptions thereof will be omitted here.

Functional Configurations

Next, the functional configurations of the player terminal 10 and the server 20 will be described. Here, the functional configurations of the player terminal 10 and the server 20 will be described in two separate steps: "generation of an estimation model for estimating a player's input" and "control of a game by using the estimation model".

"Generation of Estimation Model for Estimating Player's Input"

Figure 4:
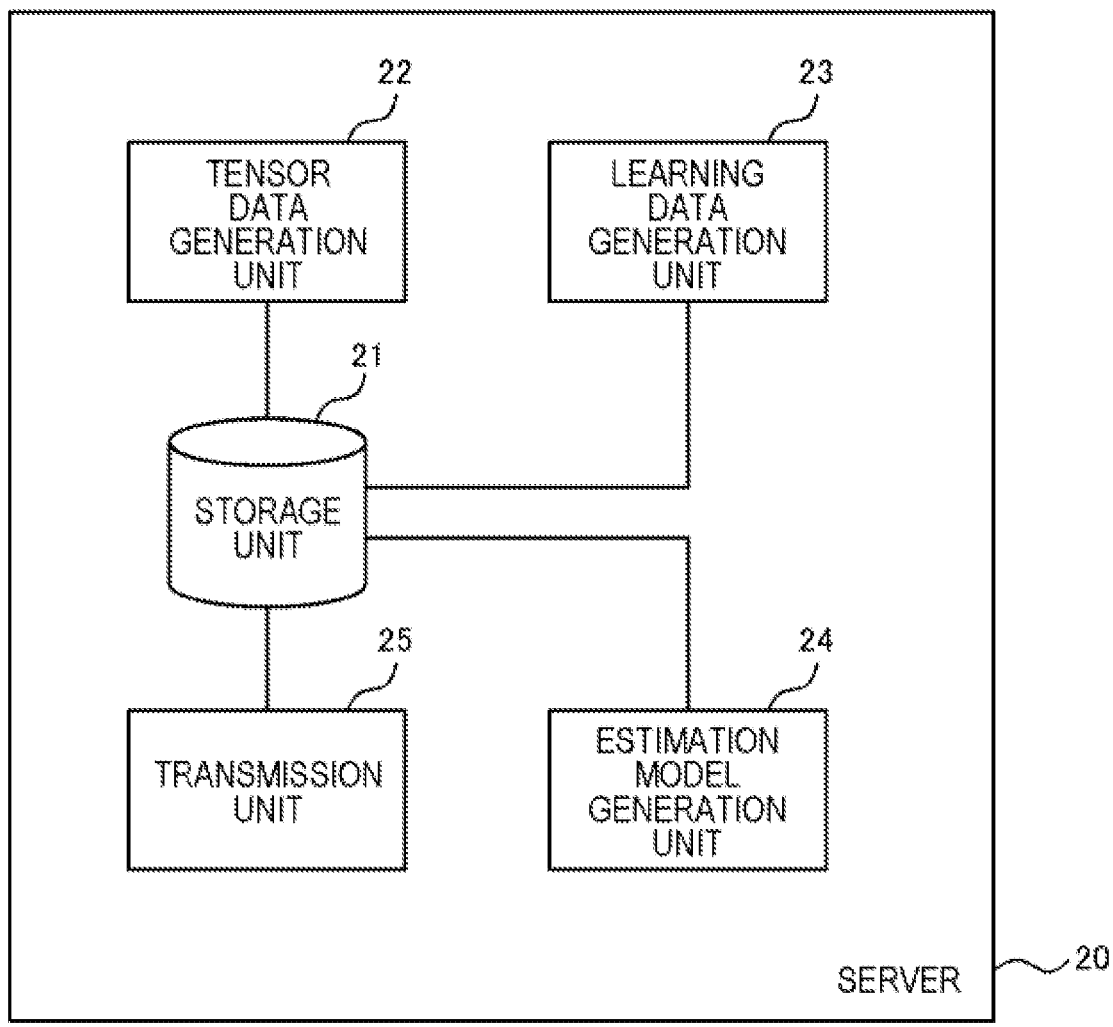
FIG. 4 is an example of the functional block diagram of the server according to this embodiment.

The generation of an estimation model is realized by the server 20. An estimation-model generation process will be described below in detail. Note that a learning-data generation process and the estimation-model generation process based on the learning data, described below, are realized, for example, through the work of the game developers at the time of game development. Also, the estimation model may be updated on the basis of data input by players during game operation. More specifically, data input by the players may be accumulated during actual game operation, learning data may be generated from the accumulated data, and a new estimation model may be generated and updated on the basis of the learning data. FIG. 4 shows an example of the functional block diagram of the server 20. As illustrated, the server 20 has: a storage unit 21; a tensor data generation unit 22; a learning data generation unit 23; an estimation model generation unit 24; and a transmission unit 25.

The tensor data generation unit 22 generates matrix data in such a manner as to correspond to each of a plurality of timings (hereinafter, referred to as "per-timing matrix data" in some cases) at intervals of a predetermined time period, and generates tensor data in which the per-timing matrix data for the respective predetermined time periods are arranged along the time axis. Then, the tensor data generation unit 22 stores the generated tensor data in the storage unit 21. This processing by means of the tensor data generation unit 22 will be described below in detail. Although "predetermined time period" is described below as "frame", this is merely an example, and the predetermined time period is not limited to a frame.

This embodiment presumes that a player's input via the touchscreen 6A is processed and an operated object (player character, etc.) is controlled on the basis of techniques disclosed in PTL 1. More specifically, in the game system according to this embodiment, the values (screen coordinates) of a touch point detected on the touchscreen 6A of each of the player terminals 10 are observed separately for each certain time interval, such as the frame time. Then, the set of values of the touch point observed every time interval are stored in a buffer as an independent array for each time interval.

Although "one time interval" is described below as "time interval corresponding to one frame", this is merely an example, and the time interval is not limited to a frame. In game applications, the frame rate is typically 60 fps or 30 fps. In the case of, for example, 30 fps, the length of the time interval corresponding to one frame is about 33 ms. In the case where a capacitive touchscreen that performs sensing, for example, at a frequency of 100 Hz is used, values of a plurality of touch points are observed in one frame (in one time interval). In this embodiment, a set of values of touch points are observed every time interval corresponding to one frame, and the set of values are stored every time interval in a buffer as an array in the order in which the values have been observed in that time interval. A set of horizontal-axis values x of touch points and a set of vertical-axis values y of the touch points can be defined as expression (1) and expression (2), respectively, below.

{Math 1}
$$x = \begin{bmatrix} x_{1,1} & \cdots & x_{n,1} \\ \vdots & \ddots & \vdots \\ x_{1,m} & \cdots & x_{n,m} \end{bmatrix} \quad \text{式 (1)}$$

式 (1): Expression (1)

{Math 2}
$$y = \begin{bmatrix} y_{1,1} & \cdots & y_{n,1} \\ \vdots & \ddots & \vdots \\ y_{1,m} & \cdots & y_{n,m} \end{bmatrix} \quad \text{式 (2)}$$

式 (2): Expression (2)

Here, $x_{a,b}$ denotes the b-th observed value in the set of horizontal-axis values of touch points observed in the time interval corresponding to the a-th frame. The values in each frame are sorted in ascending order of observation time, and the b-th value is the value observed after the (b−1)-th value and before the (b+1)-th value.

Similarly, $y_{a,b}$ denotes the b-th observed value in the set of vertical-axis values of touch points observed in the time interval corresponding to the a-th frame. The values in each frame are sorted in ascending order of observation time, and the b-th value is the value observed after the (b−1)-th value and before the (b+1)-th value.

Note that the number of touch points observed in the time interval corresponding to each frame is not always the same. For this reason, the value of the variable m can differ for each value of a. Each set of values are grouped together frame by frame in the form of a two-dimensional array.

Hereinafter, the set of values of touch points observed in the time interval corresponding to one frame on the touchscreen 6A of one player terminal 10 is referred to as a "data point group". The data point group observed in the time interval corresponding to the first frame on the touchscreen 6A of a first player terminal 10 differs from the data point group observed in the time interval corresponding to the first frame on the touchscreen 6A of a second player terminal 10. In addition, the data point group observed in the time interval corresponding to the first frame on the touchscreen 6A of the first player terminal 10 differs from the data point group observed in the time interval corresponding to the second frame on the touchscreen 6A of the first player terminal 10.

The storage unit 21 stores the history of data point groups observed on each of the plurality of player terminals 10. Also, the tensor data generation unit 22 generates tensor data through processes 1 to 3 below using data of the history.

"(Process 1) Generates, for each player terminal 10 and for each frame, a world frame matrix M indicating: a data point group observed on the touchscreen 6A of the player terminal 10 in the time interval corresponding to the frame; and the position of the operated object (player character, etc.) whose actions (movement, etc.) are controlled on the basis of the data point group".

"(Process 2) Combines the world frame matrices M generated for each frame across the player terminals 10 to generate per-timing matrix data".

"(Process 3) Stores the per-timing matrix data along the time axis to generate tensor data".

First, process 1 will be described. In this embodiment, the world frame matrix M indicates a data point group observed on the touchscreen 6A of each of the player terminals 10 in the time interval corresponding to each frame and the position of the operated object (player character, etc.) whose actions (movement, etc.) are controlled on the basis of the data point group.

The "world frame matrix M" has rows and columns corresponding to the x-axis and the y-axis in a world coordinate system (the x-axis and y-axis are the horizontal axes, and the z-axis is the vertical axis) of a 3D game space, and the value of the component at the q-th row and the r-th column indicates a state of the coordinates $(x_q, y_r)$ in the world coordinate system. The tensor data generation unit 22 maps the data point group observed on the touchscreen 6A of each of the player terminals 10 in the time interval corresponding to each frame to a predetermined position on a 2D map overlooking the 3D game space, thereby generating a world frame matrix M indicating a mapping state with the value of each of the components. The predetermined position to which the data point group is mapped is the position corresponding to the operated object (player character, etc.) whose actions (movement, etc.) are controlled on the basis of the data point group, and examples of the position include the position at which the operated object is present, the position of the surroundings thereof, etc.

The world frame matrix M can be defined as expression (3) below.

{Math 3}

$$M = \begin{bmatrix} p_{1,1} & \cdots & p_{n,1} \\ \vdots & \ddots & \vdots \\ p_{1,m} & \cdots & p_{n,m} \end{bmatrix} \quad 式\ (3)$$

式 (3): Expression (3)

Here, $p_{q,r}$ indicates whether or not an element (point) of the data point group exists at the spot corresponding to the coordinates $(x_q, y_r)$ in the world coordinate system. For example, if an element of the data point group exists, the value of $p_{q,r}$ may be set to a numerical value from 0 (exclusive) to 1 (inclusive), and if no elements of the data point group exist, the value of $p_{q,r}$ may be set to zero. The world frame matrix M may be simply implemented such that the value of $p_{q,r}$ is set to 1 if an element of the data point group exists. However, other implementations are also possible by setting a value reflecting characteristics, such as a type and a state (hit points, level, attacking power, defending power, or the like), of the operated object whose actions are controlled on the basis of the data point group, thereby achieving a world frame matrix M further indicating those characteristics. For, example, the value of $p_{q,r}$ corresponding to the position at which an element of the data point group exists may be a value normalized by the maximum hit points of the operated object, a value representing the strength of the operated object as an indicator, or the like.

In this embodiment, because learning for generating an estimation model is performed assuming, for example, GAN (Generative Adversarial Networks), the values of n and m, which indicates the size of the matrix, are fixed uniquely in the system. This enables proper machine learning.

Next, a method for mapping a data point group observed on the touchscreen 6A of a player terminal 10 to the position corresponding to the operated object on a 2D map overlooking the 3D game space will be described.

Figure 5A:
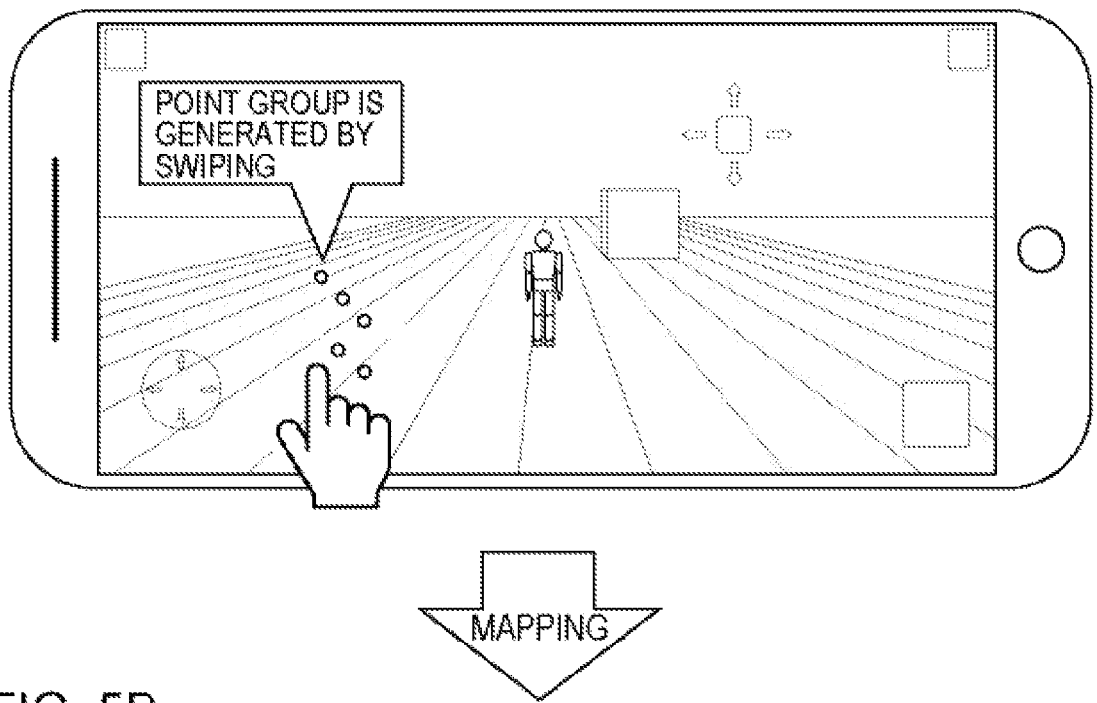
FIGS. 5A and 5B include diagrams for illustrating processing according to this embodiment.
Figure 5B:
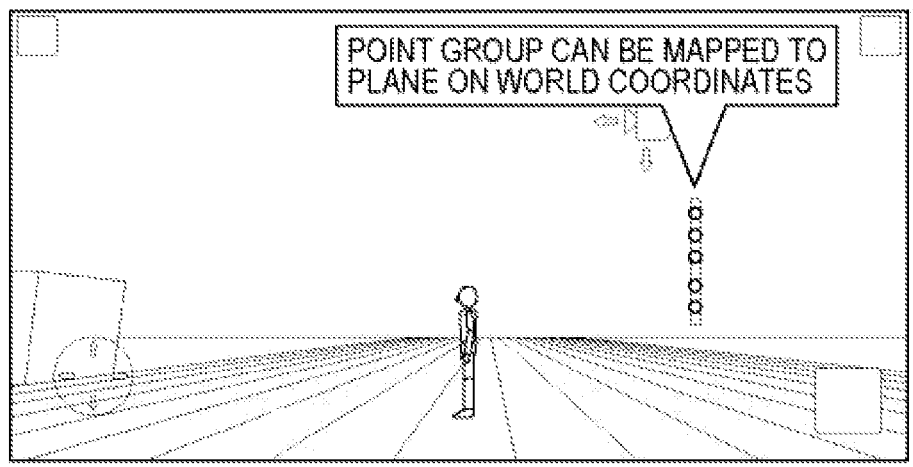

As shown in FIG. 5(A), a data point group is observed as coordinates on the physical touchscreen 6A (screen coordinates). Given that, first, the tensor data generation unit 22 maps the screen coordinates to the world coordinate system of the 3D game space, as shown in FIG. 5(B). For example, the data point group observed on the touchscreen 6A is mapped to the world coordinate system of the 3D game space on the basis of the position and orientation of the camera. The data point group observed in a state in which the camera is located in the back of the operated object, as shown in FIG. 5(A), is mapped to the back of the operated object, as shown in FIG. 5(B). By this mapping, the data point group at the screen coordinates, which are values inherent to the player terminal 10, is mapped to the world coordinate system of the 3D game space. This coordinate transformation process "map" can be defined as expression (4) below.

$$\mathrm{map}(x,y) \rightarrow x_w, y_w \ 式\ (4) \quad 式\ (4):\ \text{Expression (4)} \qquad \{\text{Math 4}\}$$

Here, x and y are an x coordinate and a y coordinate, respectively, of the screen coordinates, and $x_w$ and $y_w$ are an x coordinate and a y coordinates, respectively, of the world coordinates.

Figure 7:
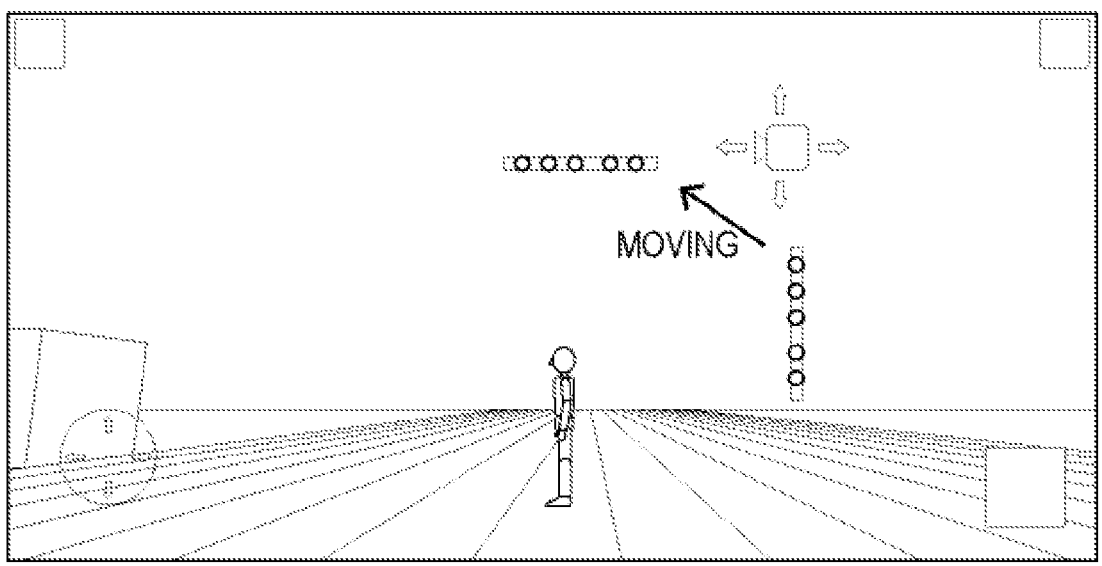
FIG. 7 is a diagram for illustrating processing according to this embodiment.

Next, as shown in FIGS. 6 and 7, the tensor data generation unit 22 maps, to the position corresponding to the operated object on the 2D map overlooking the 3D game space, the data point group that has been mapped to the world coordinate system of the 3D game space. This mapping is achieved by moving the data point group, such as rotating and/or sliding the data point group. The content of movement may be determined on the basis of, for example, the orientation of the camera, the distance between the camera and the operated object, etc.

Note that this mapping requires an ingenious way of ensuring that the control content of the operated object calculated from the data point group observed on the touchscreen 6A is the same as the control content of the operated object calculated from the data point group after being mapped. For example, it is necessary that states (shape, orientation, etc.) of the data point group observed on the touchscreen 6A have a predetermined correspondence relationship (e.g., coincidence) with states (shape, orientation, etc.) of the data point group after being mapped to the coordinate system of the 2D map. In such a case, because it is ensured that the vectors calculated from the data point groups before and after the mapping are identical, it is also ensured that the control content of the operated object (player character, etc.) based on these data point groups is identical before and after the mapping.

Here, a specific example of the relevant mapping will be described. For example, the tensor data generation unit 22 reflects, onto a local coordinate system (coordinate axes that are calculated relative to an origin set at an arbitrary position of the operated object) of the operated object, the data point group that has been mapped to the world coordinate system of the 3D game space, thereby mapping the data point group to the position corresponding to the operated object (e.g., directly above the operated object) in the local coordinate system. This mapping process "transpose" from the world coordinate system to the local coordinate system can be defined as expression (5) below.

$$\text{transpose}(x_w, y_w) \rightarrow x_l y_l \quad \text{式 (5)} \quad \text{式 (5): Expression (5)} \quad \{\text{Math 5}\}$$

Here, $x_w$ and $y_w$ are the x coordinate and the y coordinate, respectively, of a point in the world coordinates, and $x_l$ and $y_l$ are the x coordinate and the y coordinate, respectively, of a point in the local coordinates. The mapping process "transpose" can be implemented as follows in, for example, Unity®, which is a game engine.

Step 1: Project the direction vector of the camera onto a world coordinate xz plane and further normalize the direction vector to a unit vector of length 1 (apply the normalized function).
var cameraForward=Vector3.Scale (mainCamera.forward, new Vector3 (1, 0, 1)).normalized;

Note that the Y coordinate is multiplied by 0 in advance for Vector3.Scale(mainCamera.forward, new Vector3 (1, 0, 1)).

Step 2: Map the vector calculated on the basis of the data point group (movingTo: the right direction corresponds to the x-axis positive direction, and the up direction corresponds to the z-axis positive direction) onto the xz plane of the local coordinates of the operated object. The calculation of a vector on the basis of the data point group is disclosed in PTL 1.
var move=transform.InverseTransformDirection (movingTo.z* cameraForward+movingTo.x*new Vector3 (cameraForward.z, 0, −1*cameraForward.x));

Note that new Vector3 (cameraForward.z, 0, −1* cameraForward.x) rotates cameraForward by −90 degrees on the xz plane to allow a finger operation in the up direction to correspond to an operation in the depth direction of the world coordinates.

According to the above-described specific example, because the vectors calculated from the data point groups before and after the mapping are identical, it is possible to suppress a disadvantage in that the values of the angle and the speed calculated from the data point group change before and after the mapping.

Next, process 2 will be described. Process 1 generates, for each player terminal 10 and for each frame, a world frame matrix M indicating: a data point group observed on the touchscreen 6A of the player terminal 10 in the time interval corresponding to the frame; and the position of the operated object whose actions are controlled on the basis of the data point group".

In process 2, the tensor data generation unit 22 combines a plurality of world frame matrices M, which indicate: data point groups observed on the plurality of player terminals 10 in the time interval corresponding to the same one frame; and the positions of the operated objects whose actions are controlled on the basis of the data point groups. This results in the generation of one world frame matrix M (per-timing matrix data) indicating all data point groups observed on the plurality of player terminals 10 in the time interval corresponding to that frame and the positions of all operated objects whose actions are controlled on the basis of those data point groups. The tensor data generation unit 22 generates per-timing matrix data corresponding to each of the plurality of frames by applying the relevant process to each of the plurality of frames. An operator for combining two world frame matrices M and M' can be defined as expression (6) below.

{Math 6}

$$M \oplus M' := \begin{bmatrix} \max(p_{1,1}, p'_{1,1}) & \cdots & \max(p_{n,1}, p'_{n,1}) \\ \vdots & \ddots & \vdots \\ \max(p_{1,m}, p'_{1,m}) & \cdots & \max(p_{n,m}, p'_{n,m}) \end{bmatrix} \quad \text{式 (6)}$$

式 (6): Expression (6)

Here, max(u, v) is a function that returns u or v, whichever is larger. In other words, the operator in expression (6), when given two matrices of exactly the same size, generates a new matrix having the larger of the values corresponding to the same row and column. Note that, as an application, there is a possible implementation method for regarding values in the matrices as bits and calculating a bitwise OR of the bits or adding integers with a saturate calculation.

In process 3, the tensor data generation unit 22 generates tensor data by storing, along the time axis, the per-timing matrix data generated in such a manner as to correspond to the respective plurality of frames.

Figure 8:
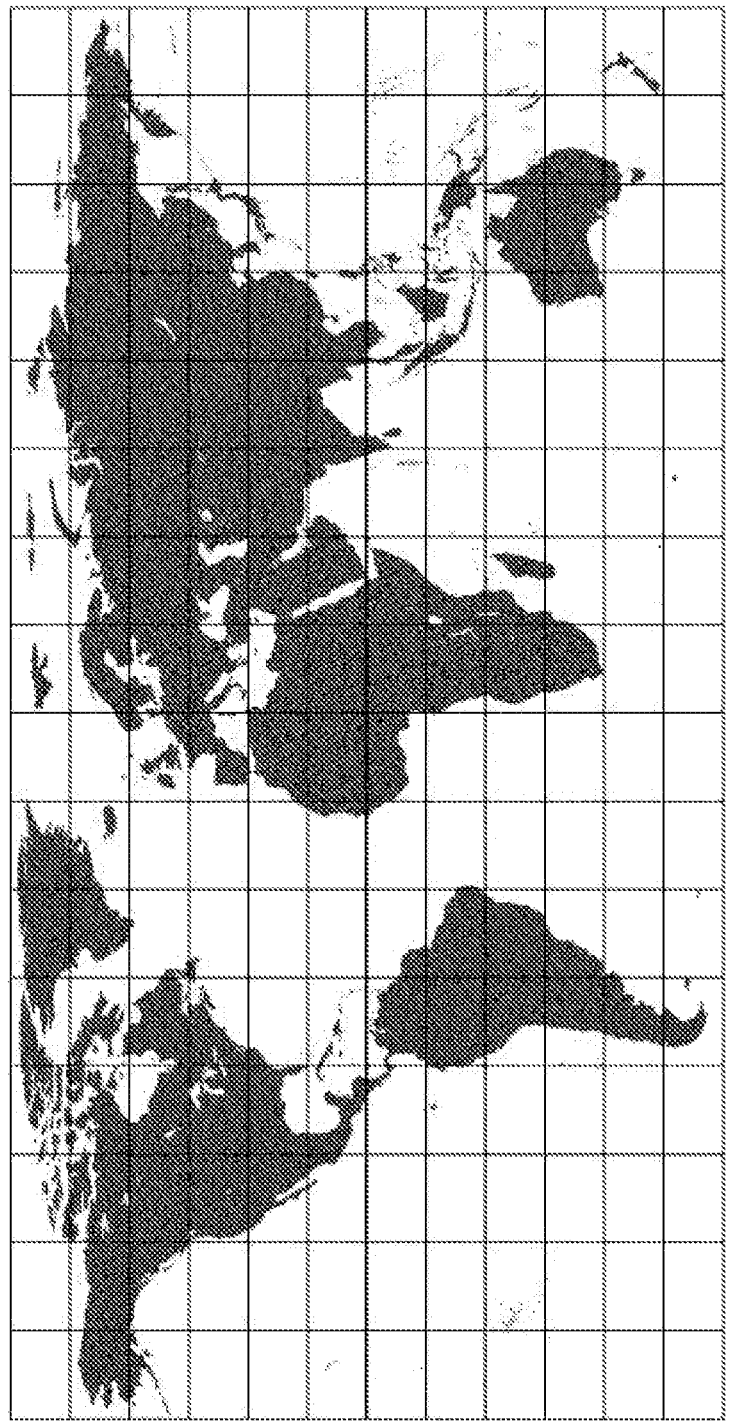
FIG. 8 is a diagram for illustrating processing according to this embodiment.
Figure 9:
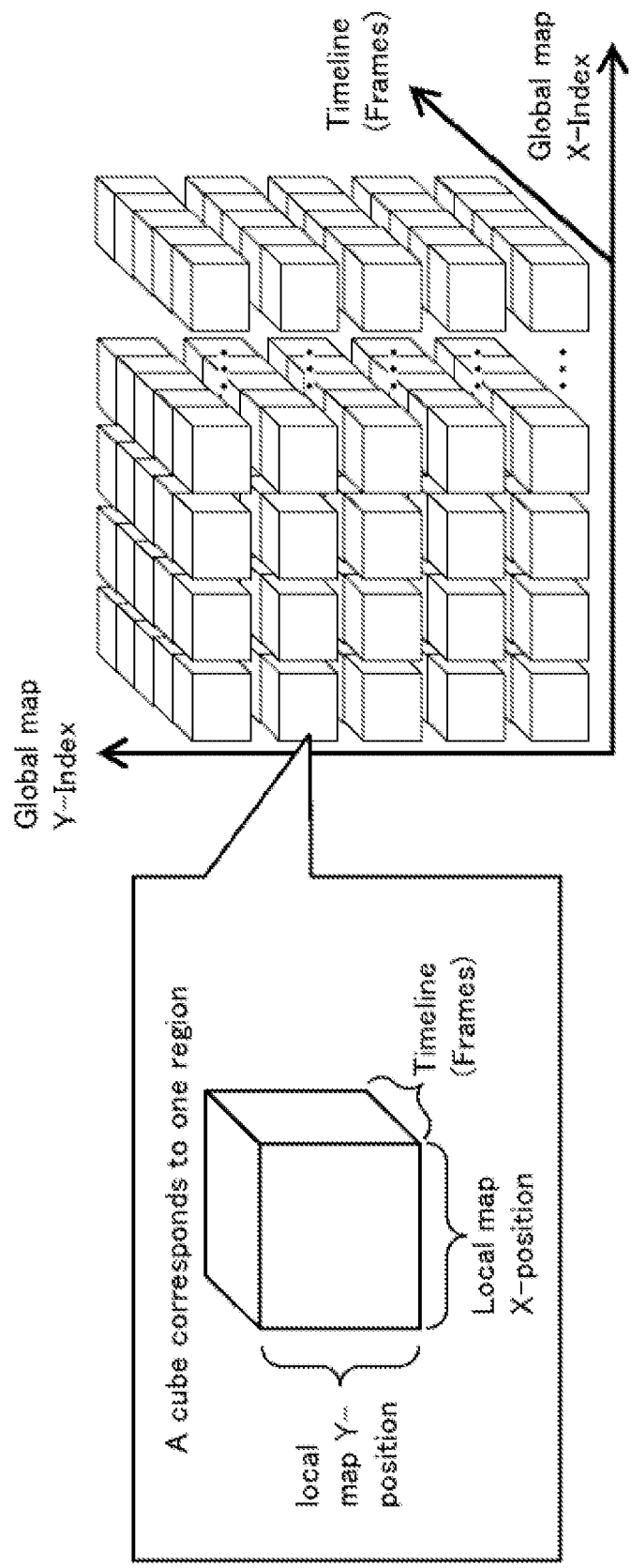
FIG. 9 is a diagram for illustrating processing according to this embodiment.

Note that the entire game space may be represented by one item of per-timing matrix data, or alternatively the entire game space may be divided into a plurality of compartments so that each of the compartments can be represented by one item of per-timing matrix data. As shown in, for example, FIG. 8, the entire game space may be divided into a finite number of compartments of a normalized size. Per-timing matrix data may then be generated for each of the compartments. FIG. 9 shows the concept of tensor data in which the per-timing matrix data generated for the individual compartments are stored along the time axis.

Referring back to FIG. 4, the learning data generation unit 23 extracts, from the tensor data generated by the tensor data generation unit 22, learning data in which the per-timing matrix data corresponding to the N-th frame (the N-th timing) is associated with the per-timing matrix data corresponding to frames after the N-th frame. For example, the learning data generation unit 23 may extract, from the tensor data, learning data in which the per-timing matrix data corresponding to the N-th frame is associated with each of the per-timing matrix data corresponding to the frames from the (N+1)-th frame to the (N+K)-th frame (where K is an integer equal to or larger than 2). The learning data generation unit 23 stores the extracted learning data in the storage unit 21.

The estimation model generation unit 24 generates, by means of machine learning (generative adversarial networks (GAN) or the like) based on the learning data generated by the learning data generation unit 23, an estimation model for producing, from the per-timing matrix data corresponding to a certain frame, an estimation result of the per-timing matrix data corresponding to a subsequent frame. The estimation model generation unit 24 then stores the produced estimation model in the storage unit 21.

Here, the concept of machine learning performed by the estimation model generation unit 24 will be described by using FIG. 10. FIGS. 10(A) and 10(B) show a 2D map overlooking the 3D game space. FIG. 10(A) shows the state of the N-th frame, and FIG. 10(B) shows the state of a subsequent frame. The figures show three operated objects, as well as data point groups that correspond to the respective operated objects and that are observed on the three respective player terminals 10 in the time interval corresponding to each of the frames. The data point groups are mapped to the positions of the respective operated objects by the above-described method.

FIGS. 10(C) and 10(D) illustrate the content of per-timing matrix data made to represent the states of the data point groups in FIGS. 10(A) and 10(B) as described above. One square in each of the tables corresponds to one component $p_{q,r}$ of the per-timing matrix data, and the value of the component $p_{q,r}$ is represented by the state of the square. Also, the value of the component $p_{q,r}$ indicates whether or not an element of the data point group is located in the corresponding square.

The estimation model generation unit 24 can graphically display the per-timing matrix data stored as learning data in the form shown in, for example, FIGS. 10(C) and 10(D), convert the data into bitmap data, and perform machine learning on the basis of the obtained drawing files.

In this manner, the learning process in this embodiment expresses a change in input content between two frames (change in the data point group) as a "change in pattern (FIG. 10(C)→FIG. 10(D))" and makes the neural network learn this change. As a result, it is possible to automatically generate the next pattern (FIG. 10(D)) when a certain pattern (FIG. 10(C)) is given. This means predicting, from the input content in a frame, input content in a subsequent frame.

In this embodiment, machine learning may be repeated while thinning out, for example, the number of data point groups. By doing so, it is possible to predict a future situation at high speed and with high accuracy merely by sharing, among clients, only a very small amount of touch data.

The learn function, which is a function for performing learning by using the GAN, receives a learning data bucket Be corresponding to a particular compartment c and outputs a model Go for predicting an operation to be performed in the compartment c. The learn function is defined as expression (7) below.

$$\text{learn}(B_c) \rightarrow G_c \qquad (7): \text{Expression (7)} \qquad \{\text{Math 7}\}$$

Assuming that all buckets possessed by this system are B, a learning data bucket $B_c$ corresponding to a particular compartment c can be defined as expression (8) below.

$$B_c = \{M_1, M_2, M_3, \ldots M_d\} \quad (8) \quad (8): \text{Expression (8)} \qquad \{\text{Math 8}\}$$

Here, $M_i$ is the per-timing matrix data corresponding to the i-th frame in the compartment c. The learn function takes a set of $M_e$ and $M_{e+f}$ as an input to the GAN (where f is an integer equal to or larger than 1).

Note that it is also possible to generate $M_e'$ by thinning out an arbitrary number of data point groups from $M_e$ and then take a set of $M_e'$ and $M_{e+f}$ as an input to the GAN. This makes it possible to infer input content in a future frame on the basis of a smaller number of data point groups.

The predict function, serving as the estimation model generated by the estimation model generation unit 24, is a function that, when the per-timing matrix data corresponding to a certain frame is input, estimates per-timing matrix data corresponding to a subsequent frame and can be defined as expression (9) below.

$$\text{predict}(M_c, n) \rightarrow M'_c \quad (9) \quad (9) \text{ Expression (9)} \qquad \{\text{Math 9}\}$$

Here, $M_c$ is the per-timing matrix data corresponding to a certain frame in a compartment c, n is the frame number of the future frame to be predicted, and $M_c'$ is the estimated per-timing matrix data corresponding to the "frame n frames ahead from the certain frame".

Referring back to FIG. 4, the transmission unit 25 transmits the estimation model stored in the storage unit 21 to the plurality of player terminals 10. For example, the server 20 may manage the position of each of the plurality of operated objects. Also, the transmission unit 25 may transmit the estimation model corresponding to the compartment in which each of the plurality of operated objects is present to the player terminals 10 for controlling the operated objects.

For example, according to the fact that an operated object has moved from the first compartment to the second compartment, the transmission unit 25 may transmit the estimation model corresponding to the second compartment to a predetermined player terminal 10.

Moreover, the server 20 may predict input content in the frame several frames ahead on the basis of the above-described estimation model and predict, on the basis of the prediction result, the position of each of the plurality of operated objects several frames ahead. Also, according to a prediction result indicating that the operated object will move from the first compartment to the second compartment, the transmission unit 25 may transmit the estimation model corresponding to the second compartment to a predetermined player terminal 10.

"Control of Game by Using Estimation Model"

Figure 11:
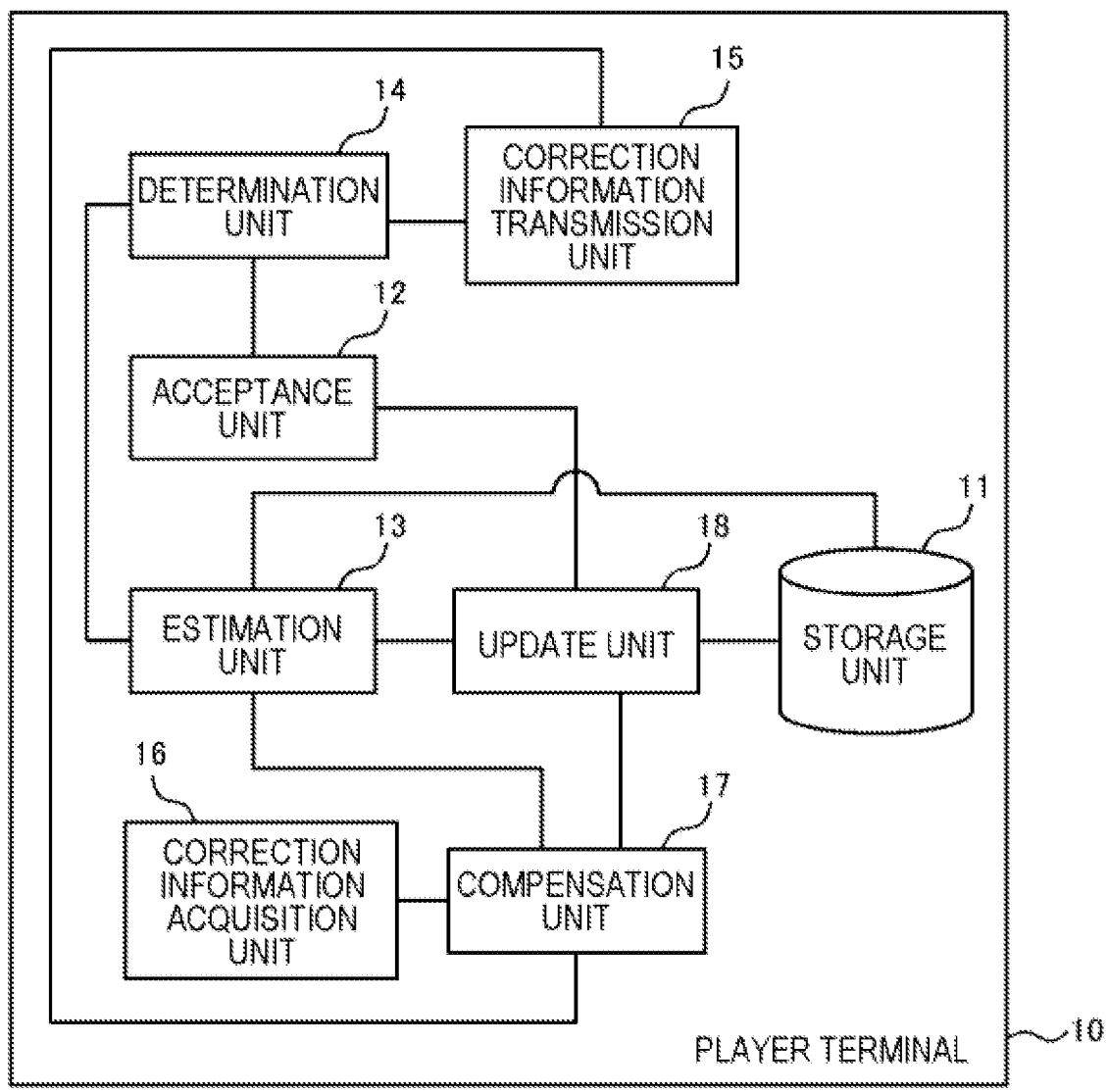
FIG. 11 is an example of the functional block diagram of the player terminal according to this embodiment.

FIG. 11 shows an example of the functional block diagram of a player terminal 10. As illustrated, the player terminal 10 has: a storage unit 11; an acceptance unit 12; an estimation unit 13; a determination unit 14; a correction information transmission unit 15; a correction information acquisition unit 16; a compensation unit 17; and an update unit 18.

The storage unit 11 stores the estimation model transmitted by the server 20. In addition, the storage unit 11 stores various kinds of information about the game. As shown in, for example, FIG. 12, the storage unit 11 stores state values corresponding to each of the plurality of operated objects. Actions of each of the plurality of operated objects are controlled by each of the plurality of player terminals 10. The state values include, but are not limited to, the position in the game space, hit points, etc. On the basis of those state values, the player terminal 10 generates a screen to be displayed on its own display, and displays the screen on its own display. More specifically, the player terminal 10 generates a game screen on which each of the plurality of operated objects is arranged at the position indicated by state values, and displays the game screen on its own display.

The acceptance unit 12 accepts the player's input. For example, the acceptance unit 12 accepts a touch input via the touchscreen 6A, an input via a physical button, etc. The acceptance unit 12 observes the values (screen coordinates) of a touch point detected on the touchscreen 6A, separately for each certain time interval, such as the frame time. Then, the acceptance unit 12 stores the set of values of the touch point (data point group) observed every time interval in a buffer as an independent array for each time interval.

On the basis of: an estimation model for producing, from per-timing information indicating the content of the player's input accepted by each of the plurality of player terminals 10 in such a manner as to correspond to a certain frame (certain timing), an estimation result of the per-timing information corresponding to a subsequent frame (subsequent timing); and per-timing information corresponding to a first frame (first timing), the estimation unit 13 produces an estimation result corresponding to a second frame (second timing), which is later than the first frame (first timing).

The estimation model processed by the estimation unit 13 is the estimation model generated by the server 20, i.e., the estimation model that is received from the server 20 and stored in the storage unit 11.

The per-timing information has the same format as the above-described per-timing matrix data and indicates a data point group accepted in such a manner as to correspond to a certain frame by each of the player terminals 10 actually participating in the game at that time and the position of the operated object whose actions are controlled on the basis of the data point group. The "data point group accepted in such a manner as to correspond to a certain frame" is a data point group accepted to control the operated object in that frame.

The estimation unit 13 can produce an estimation result for a frame, for example, one to ten-odd frames ahead.

Note that the estimation units 13 realized in the respective plurality of player terminals 10 produce the same estimation result on the basis of the same estimation model.

The determination unit 14 determines whether or not the content (data point group) of the player's input accepted by the acceptance unit 12 in such a manner as to correspond to the second frame coincides with the estimation content (data point group) of the player's input that is indicated as an estimation result and that corresponds to the second frame. Note that the coincidence here may be a perfect coincidence, or a predefined "slight deviation" may be permitted. For example, a data point group may be vectorized by using a technique disclosed in PTL 1 (Publication of Japanese Patent No. 6389581), and a deviation of ±1 degree may be permitted.

If the determination result produced by the determination unit 14 indicates non-coincidence, the correction information transmission unit 15 transmits, to an external device, correction information indicating the content of the player's input accepted by the acceptance unit 12. For example, the correction information transmission unit 15 may transmit the correction information to the server 20. In this case, the server 20 transmits the received correction information to the other player terminals 10. Alternatively, the correction information transmission unit 15 may transmit the correction information directly to the other player terminals 10 without intervening in the server 20.

The correction information acquisition unit 16 acquires correction information transmitted by another player terminal 10.

The compensation unit 17 compensates for the estimation result on the basis of the correction information acquired by the correction information acquisition unit 16. The correction information includes at least correct input content and information for identifying the operated object whose actions are controlled on the basis of that input.

The update unit 18 updates the state values (refer to FIG. 12) of the operated object on the basis of the estimation result. In the case where the estimation result is compensated for by the compensation unit 17, the update unit 18 can update state values of the operated object on the basis of the estimation result that has been compensated for or the correction information acquired by the correction information acquisition unit 16. In addition, the update unit 18 can update state values of the operated object on the basis of the content of the player's input accepted by the acceptance unit 12. Note that processing for determining the control content (movement direction, etc.) of the operated object from the data point group is described in PTL 1 (Publication of Japanese Patent No. 6389581), and will not be described here.

Next, an example of the flow of processing in a player terminal 10 will be described by using the flowcharts in FIGS. 13 and 14. Although not shown in the figures, for example, immediately after a player terminal 10 has logged into the server 20 and participated in the game, an estimation model determined on the basis of the initial position, etc. of the operated object to be controlled by that player terminal 10, as well as state values, etc. corresponding to each of the plurality of operated objects as shown in FIG. 12, is transmitted from the server 20 to that player terminal 10. The player terminal 10 stores the received information in the storage unit 11. Then, the player terminal 10 performs the following processing.

Figure 13:
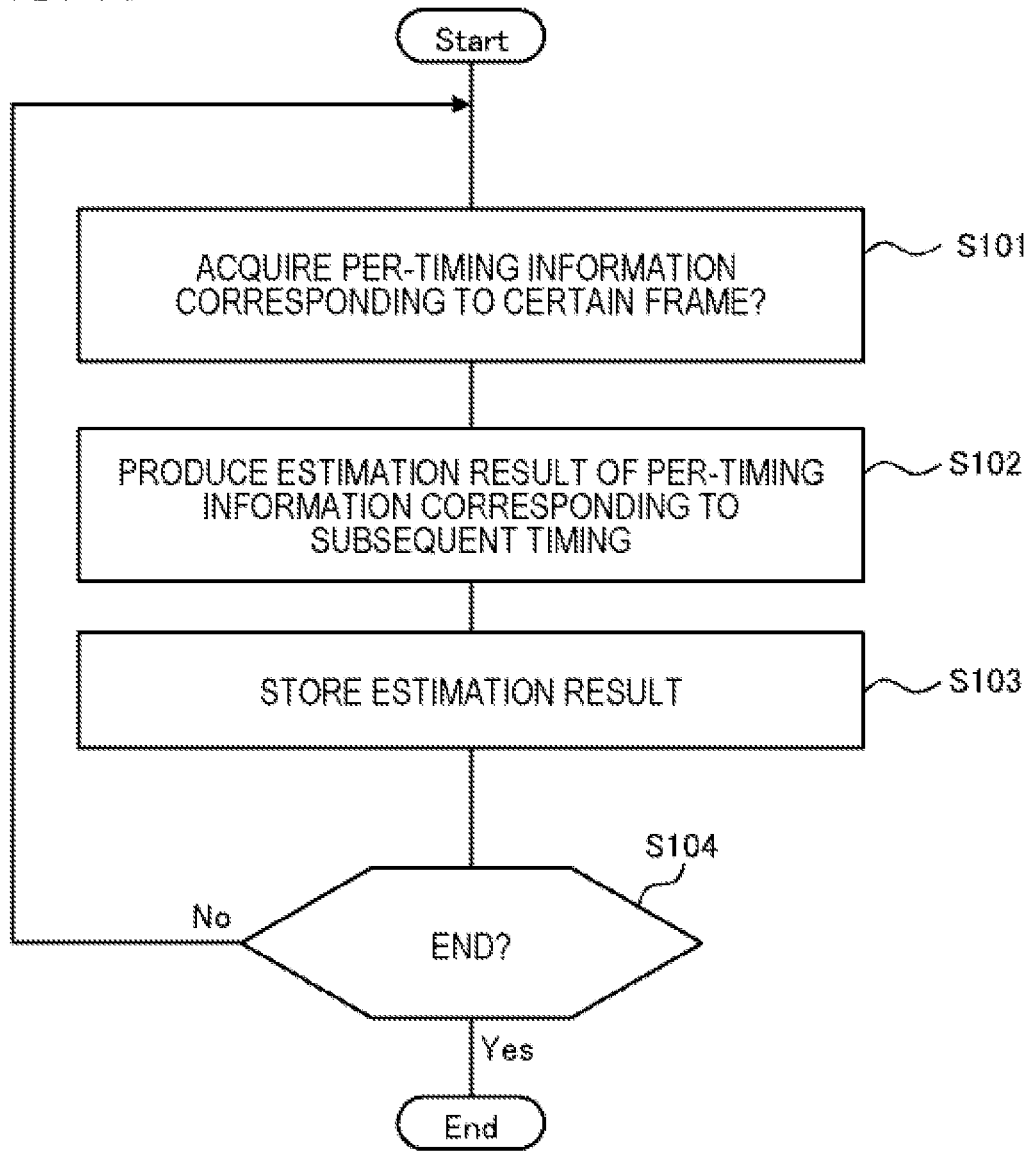
FIG. 13 is a flowchart showing an example of the flow of processing in the player terminal according to this embodiment.

First, as shown in FIG. 13, the player terminal 10 acquires the per-timing information corresponding to a certain frame (S101). Immediately after participating in the game, the player terminal 10 may acquire the per-timing information from the server 20.

Also, the estimation unit 13 of the player terminal 10 produces an estimation result of the per-timing information corresponding to each of the subsequent frames (e.g., 1 to 15 frames ahead) on the basis of the estimation model stored in the storage unit 11 and the per-timing information acquired in S101 (S102). Then, the estimation unit 13 stores the produced estimation results in the storage unit 11 (S103). Thereafter, the player terminal 10 returns to S101 and repeats production and storage of an estimation result of per-timing information.

Figure 14:
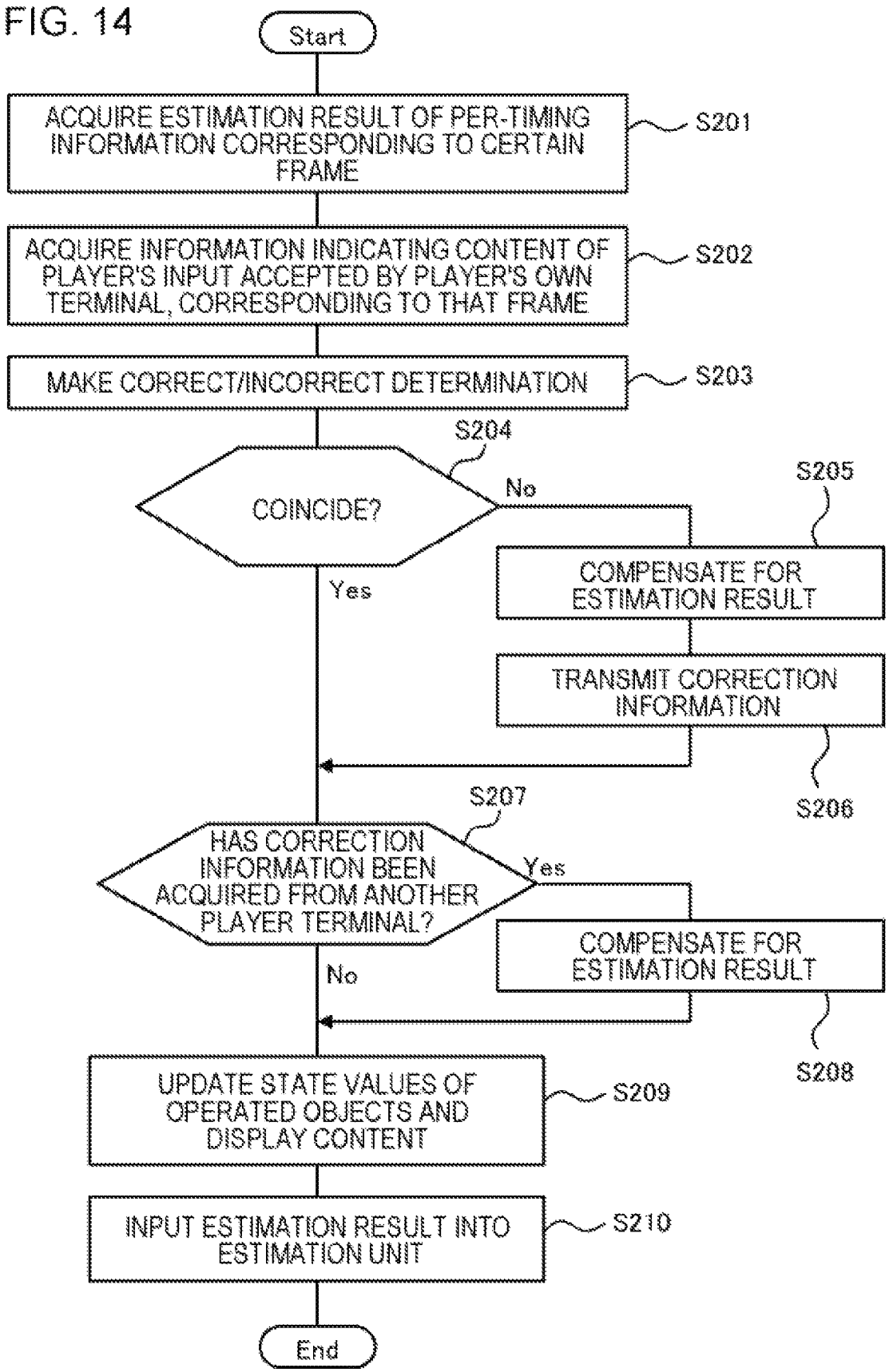
FIG. 14 is a flowchart showing an example of the flow of processing in the player terminal according to this embodiment.

In addition, as shown in FIG. 14, when the determination unit 14 acquires, from the storage unit 11, the estimation result of the per-timing information corresponding to a certain frame (S201) and acquires information indicating the content of the player's input accepted by the acceptance unit 12 in such a manner as to correspond to that frame (S202), the determination unit 14 determines whether or not the content of the player's input accepted in such a manner as to correspond to that timing coincides with the estimation content of the player's input that corresponds to that timing and that is indicated by the estimation result (S203). Note that the order of processing in S201 and S202 is not limited to the one described above.

Then, in the case where the determination result indicates non-coincidence (No in S204), the compensation unit 17 compensates for the estimation result acquired in S201 on the basis of the information indicating the content of the player's input acquired in S202 (S205). In addition, the correction information transmission unit 15 transmits, to an external device, the correction information indicating the content of the player's input accepted by the acceptance unit 12 (S206). Note that the order of processing in S205 and S206 is not limited to the one described above.

If the processing in S204 results in Yes, the processing in S207 is also executed after S206. In S207, it is determined whether or not correction information transmitted by another player terminal 10 in such a manner as to correspond to that frame has been acquired by the correction information acquisition unit 16.

In the case where the correction information has been acquired (Yes in S207), the compensation unit 17 compensates for the estimation result acquired in S201 on the basis of the acquired correction information (S208).

If the processing in S207 results in Yes, the processing in S209 is also executed after S208. In S209, the update unit 18 updates state values (refer to FIG. 12) corresponding to each of the plurality of operated objects stored in the storage unit 11 on the basis of at least one of the estimation result acquired in S201, the information indicating the content of the player's input acquired in S202, the estimation result after being compensated for in S205 and/or S208, and the correction information transmitted by another player terminal 10. Then, the player terminal 10 updates the game screen on the display on the basis of the updated state values.

In subsequent step S210, in the case where the estimation result has been compensated for by the compensation unit 17 in at least one of steps S205 and S208, the estimation unit 13 acquires the estimation result that has been compensated for. On the other hand, in the case where the estimation result has not been compensated for, the estimation unit 13 acquires the estimation result that has not been compensated for. In step S101, the estimation unit 13 acquires, as per-timing information corresponding to a certain frame, the acquired estimation result that has been compensated for or has not been compensated for. The estimation unit 13 then produces a new estimation result on the basis of that per-timing information (S102).

Modifications

Next, modifications will be described. In addition to the content of a player's input and the position of the operated object in the game space, the per-timing matrix data may indicate other information that can affect the content of the player's input. For example, the per-timing matrix data may further indicate: characteristics, such as the type and states (hit points, level, attacking power, defending power, etc.), of the operated object; positions, in the game space, of non-operated objects (characters whose actions are controlled by the computer, obstacles, such as mountains, oceans, and buildings, that block movement, etc.); and characteristics, such as the type and states (hit points, level, attacking power, defending power, etc.), of a non-operated object. These items of information can be indicated by means of the values of components $p_{q,r}$ of the per-timing matrix data.

When the per-timing matrix data is to be graphically shown, different values of components $p_{q,r}$ can be expressed, for example, by color (FIG. 15(C)), brightness, addition of a point to a predetermined position (FIG. 15(D)), or the like, as shown in FIG. 15.

According to such a modification, it is possible to estimate input content several frames ahead by taking into account a wide variety of information that can affect the content of the player's input. As a result, the estimation accuracy is enhanced.

Another modification will be described. The tensor data generation unit 22 may generate, every predetermined time period, matrix data indicating a state of the world coordinate system in which encode information, instead of a data point group, obtained by encoding a vector calculated from the data point group is associated with and mapped to the position of each of the operated objects. The encode information may indicate a vector calculated from a data point group on the basis of the orientation and size of the convex shape, as shown in, for example, FIG. 16. Encode information to which the above-described various kinds of information are assigned may be mapped by means of color, brightness, addition of a point to a predetermined position, etc., as in the above-described modification.

The function encode, which encodes status information (e.g., characteristics, such as the type and states (hit points, level, attacking power, defending power, etc.), of an operated object) in the game, can be defined as expression (10) below.

$$\text{encode}(S, M) \to M' \overset{\rightarrow}{\pi}_* (10) \quad \overset{\rightarrow}{\pi}_* (10): \text{Expression (10)} \quad \{\text{Math 10}\}$$

Here, S is status information in the game, and M is a world frame matrix corresponding to a certain frame of a certain player terminal 10.

Effects

Next, the effects of this embodiment will be described. In order to achieve, for example, 30 FPS in the case of a method in which all input content accepted by each of the player terminals 10 is transmitted to another player terminal 10, it is necessary to transmit and receive UDP packets at "30 Hz (30 round trips per second)". In contrast, in order to achieve, for example, 30 FPS in the method according to this embodiment in which, of the input content accepted by each of the player terminals 10, only the input content predicted incorrectly is transmitted to another player terminal 10, the frequency at which UDP packets are transmitted and received can be decreased to "30 Hz or less". The frequency is 30 Hz if the prediction is 100% incorrect, and the frame rate is less than 30 FPS if the prediction is correct at least partially. It is rare and almost impossible for the prediction to be 100% incorrect successively. With such a game system according to this embodiment, a multiplay communication method with high efficiency, low delay, and high resistance to packet-loss can be realized.

The greatest advantage of this embodiment is "non-destructiveness", which can reduce the amount of data communication without changing the existing game content. In addition to this non-destructiveness, this embodiment has the following advantages.

High packet reduction rate: Because the frequency of communication and the amount of communication itself can be reduced, more action-oriented, multiplayer play can be realized in MMO games for smartphones, which suffer more packet loss and have a more limited bandwidth.

High resistance to packet loss: Because the frequency at which packets themselves are transmitted can be reduced, this embodiment is inherently resistant to packet loss. Furthermore, if this embodiment contributes to more room for the network bandwidth, countermeasures against packet loss, such as increasing the frequency of communication or transmitting the history of the previous actions in a single communication, can be easily introduced.

Application to anti-cheat measures: Because this model transmits only packets corresponding to the difference by which the prediction on the basis of the estimation model has deviated, this embodiment can yield characteristics appropriate for cheat prevention and long-term, large-scale operation based on continuous machine learning.

Can be consistently integrated with delta compression: This embodiment can be used appropriately according to purposes and cases, such as using delta compression, which is appropriate for transmission/reception of status information, to transmit/receive status information and using this embodiment, which is appropriate for compression of movement information, to compress movement information.

Also, intuitively, this embodiment is a technique that can be used as a "communication buffer for storing several frames of input content for automatically compensating for content that is not communicated". Therefore, this embodiment can be implemented as an upper layer that uses existing communication middleware, such as Photon and monobit. Furthermore, this embodiment can be consistently combined with compression of status information by means of existing delta compression.

In this specification, "acquisition" means at least one of "the player's own device retrieving data stored in another device or in a storage medium (active acquisition)" on the basis of either a user input or a program instruction and "the player's own device allowing data output from another device to be input thereinto (passive acquisition)" on the basis of either a user input or a program instruction. Examples of the active acquisition include the player's own device sending a request or inquiry to another device and receiving data, the player's own device accessing another device or a storage medium and reading data, etc. Examples of the passive acquisition include the player's own device waiting in such a manner as to be capable of receiving data transmitted from an external device and receiving data transmitted from the external device, the player's own device receiving data distributed (or transmitted, push-notified, etc.) from an external device, the player's own device receiving data or information selectively from the received data or information, and the player's own device "editing data (converting the data into text, sorting the data, extracting a portion of the data, changing the file format of the data, or the like), etc. to generate new data and then acquiring the relevant new data".

Some or all of the above-described embodiments can be described as, but not limited to, the following appendix.

1. A program for causing a computer in each of a plurality of player terminals that establish data communication with each other directly or via a server to function as:
   a storage unit for storing a state value corresponding to each of a plurality of operated objects;
   an acceptance unit for accepting a player input;
   an estimation unit that produces an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;
   a determination unit for determining whether or not the content of the player input accepted by the acceptance unit in such a manner as to correspond to the second timing coincides with estimation content of the player input that is indicated by the estimation result and that corresponds to the second timing;
   a correction information transmission unit that, if a determination result produced by the determination unit indicates non-coincidence, transmits, to an external device, correction information indicating the content of the player input accepted by the acceptance unit;
   a correction information acquisition unit for acquiring the correction information transmitted by another player terminal;
   a compensation unit for compensating for the estimation result on the basis of the correction information; and
   an update unit for updating the state value of the operated object on the basis of the estimation result.

2. The program according to 1,
   wherein, in the case where the estimation result is compensated for by the compensation unit, the update unit updates the state value of the operated object on the basis of the estimation result that has been compensated for or the correction information.

3. The program according to 1 or 2,
   wherein, in the case where the estimation result is compensated for by the compensation unit, the estimation unit produces a new estimation result on the basis of the estimation result that has been compensated for and the estimation model, and
   in the case where the estimation result is not compensated for by the compensation unit, the estimation unit produces a new estimation result on the basis of the estimation result that has not been compensated for and the estimation model.

4. The program according to any one of 1 to 3,
   wherein the per-timing information is matrix data that has rows and columns corresponding to an x-axis and a y-axis in a world coordinate system of a game space and in which the value of the component at the q-th row and the r-th column indicates a state of coordinates $(x_q, y_r)$ in the world coordinate system, said matrix data indicating the position of each of the operated objects in the game space and the content of the player input corresponding to each of the operated objects.

5. The program according to 4,
   wherein the matrix data indicates, as the content of the player input corresponding to each of the operated objects, a data point group at screen coordinates detected on a touchscreen of the player terminal.

6. The program according to 4,
   wherein the matrix data indicates, as the content of the player input corresponding to each of the operated objects, information obtained by encoding a vector calculated from a data point group at screen coordinates detected on a touchscreen of the player terminal.

7. The program according to any one of 4 to 6,
   wherein the matrix data indicates a state of the world coordinate system in which information indicating the content of the player input corresponding to each of the operated objects is associated with and mapped to the position of each of the operated objects.

8. The program according to any one of 4 to 7,
   wherein the estimation model is generated through machine learning based on learning data that is extracted from tensor data storing the matrix data along a time axis and in which the matrix data corresponding to an N-th timing is associated with the matrix data corresponding to a timing after the N-th timing.

9. The program according to 8,
   wherein the estimation model is generated through the machine learning based on the learning data that is extracted from the tensor data storing the matrix data along the time axis and in which the matrix data corresponding to the N-th timing is associated with each of the matrix data corresponding to timings from an (N+1)-th timing to an (N+K)-th timing, where K is an integer equal to or larger than 2.

10. The program according to any one of 1 to 9,
wherein the per-timing information further indicates, in addition to the content of the player input, at least one of the position of the operated object in the game space, the position of a non-operated object in the game space, a characteristic of the operated object, and a characteristic of the non-operated object.

11. The program according to any one of 1 to 10,
wherein the estimation unit realized in each of the plurality of player terminals produces the estimation result on the basis of the same estimation model.

12. A server having:
a tensor data generation unit that generates, at intervals of a predetermined time period, matrix data indicating a state of a world coordinate system in which a data point group indicating touch positions at screen coordinates detected on a touchscreen of each of a plurality of player terminals in such a manner as to correspond to each of a plurality of timings at intervals of the predetermined time period is associated with and mapped to the position of each operated object and that generates tensor data storing the matrix data along a time axis;
a learning data generation unit for extracting, from the tensor data, learning data in which the matrix data corresponding to an N-th timing is associated with the matrix data corresponding to a timing after the N-th timing; and
an estimation model generation unit for generating, through machine learning based on the learning data, an estimation model for producing, from the matrix data corresponding to a certain timing, an estimation result of the matrix data corresponding to a subsequent timing.

13. The server according to 12,
wherein the learning data generation unit extracts, from the tensor data, learning data in which the matrix data corresponding to the N-th timing is associated with each of the matrix data corresponding to timings from an (N+1)-th timing to an (N+K)-th timing, where K is an integer equal to or larger than 2.

14. The server according to 12 or 13,
wherein the tensor data generation unit generates, at intervals of the predetermined time period, matrix data indicating a state of a world coordinate system in which encode information, instead of the data point group, obtained by encoding a vector calculated from the data point group is associated with and mapped to the position of each of the operated objects and generates tensor data storing the matrix data along the time axis.

15. A processing method including causing a computer in each of a plurality of player terminals that establish data communication with each other directly or via a server to:
store a state value corresponding to each of a plurality of operated objects;
accept a player input;
produce an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;
determine whether or not the content of the player input accepted in such a manner as to correspond to the second timing coincides with estimation content of the player input that is indicated by the estimation result and that corresponds to the second timing;
transmit, to an external device, correction information indicating the content of the accepted player input if a determination result indicates non-coincidence;
acquire the correction information transmitted by another player terminal;
compensate for the estimation result on the basis of the correction information; and
update the state value of the operated object on the basis of the estimation result.

16. A processing system including a plurality of player terminals and a server,
wherein each of the player terminals has:
a storage unit for storing a state value corresponding to each of a plurality of operated objects;
an acceptance unit for accepting a player input;
an estimation unit that produces an estimation result corresponding to a second timing, which is later than a first timing, on the basis of an estimation model for producing, from per-timing information indicating the content of the player input accepted by each of the plurality of player terminals in such a manner as to correspond to a certain timing, an estimation result of the per-timing information corresponding to a subsequent timing, as well as on the basis of the per-timing information corresponding to the first timing;
a determination unit for determining whether or not the content of the player input accepted by the acceptance unit in such a manner as to correspond to the second timing coincides with estimation content of the player input that is indicated by the estimation result and that corresponds to the second timing;
a correction information transmission unit that, if a determination result produced by the determination unit indicates non-coincidence, transmits, to an external device, correction information indicating the content of the player input accepted by the acceptance unit;
a correction information acquisition unit for acquiring the correction information transmitted by another player terminal;
a compensation unit for compensating for the estimation result on the basis of the correction information; and
an update unit for updating the state value of the operated object on the basis of the estimation result, and
the server has a transmission unit that, upon receiving the correction information from a player terminal, transmits the received correction information to the other player terminals.

17. The processing system according to claim 16,
wherein the server further includes:
a tensor data generation unit that generates, at intervals of a predetermined time period, matrix data indicating a state of a world coordinate system in which a data point group indicating touch positions at screen coordinates detected on a touchscreen of each of a plurality of player terminals in such a manner as to correspond to each of a plurality of timings at intervals of the predetermined time period is associated with and mapped to the position of each of the operated objects and that generates tensor data storing the matrix data along a time axis;
a learning data generation unit for extracting, from the tensor data, learning data in which the matrix data corresponding to an N-th timing is associated with the matrix data corresponding to an (N+1)-th timing immediately after the N-th timing; and an estimation model generation unit for generating, through machine learning based on the learning data, an estimation model for producing, from the matrix data corresponding to a certain timing, an estimation result of the matrix data corresponding to a subsequent timing, and the transmission unit transmits the same estimation model to the plurality of player terminals.

Although the present invention has been described above with reference to embodiments (and examples), the present invention is not limited to the above-described embodiments (and examples). The configuration and details of the present invention can be subjected to various modifications that can be understood by a person skilled in the art within the scope of the present invention.

This application claims the right of priority based on Japanese Patent Application No. 2019-222683 filed on 10 Dec. 2019, and incorporates the entire disclosure thereof herein.

REFERENCE SIGNS LIST

1A Processor
2A Memory
3A Input/output I/F
4A Peripheral circuit
5A Bus
6A Touchscreen
7A Communication unit
10 Player terminal
11 Storage unit
12 Acceptance unit
13 Estimation unit
14 Determination unit
15 Correction information transmission unit
16 Correction information acquisition unit
17 Compensation unit
18 Update unit
20 Server
21 Storage unit
22 Tensor data generation unit
23 Learning data generation unit
24 Estimation model generation unit
25 Transmission unit
30 Communication network

The invention claimed is:

1. A nontransitory computer-readable medium comprising program instructions for causing a computer to perform a method comprising:

storing a plurality of state values of a computer game corresponding to a plurality of player characters that are controlled in a computer game space by a plurality of player terminals over a communication network;

accepting a player input by an input device at a first timing for controlling a player character among the plurality of player characters within the computer game;

determining an estimation result corresponding to a second timing, which is later than the first timing, based on an estimation model, wherein the estimation model produces the estimation result for the second timing based on per-timing information regarding a plurality of player inputs for the plurality of player characters that are accepted by the plurality of player terminals for the first timing, wherein the per-timing information comprises matrix data that has rows and columns corresponding to an x-axis and a y-axis in a world coordinate system of the computer game space and in which a value of a component at a q-th row and an r-th column indicates a state of coordinates $(X_q, V_r)$ in the world coordinate system, wherein the matrix data indicates a first plurality of positions of the plurality of player characters in the computer game space and input content of the plurality of player inputs for the plurality of player characters, and wherein the estimation model is a machine learning model that is generated using a learn function and a plurality of game logs that are obtained by a server for a plurality of computer games;

determining whether accepted input content of the player input accepted by the input device for the second timing coincides with predicted input content of the player input that is indicated by the estimation result for the second timing;

transmitting, in response to a determination result indicating a non-coincidence of the accepted input content and the predicted input content for the second timing, first correction information indicating the accepted input content of the player input;

acquiring second correction information transmitted by another player terminal;

compensating for the estimation result to produce a compensated estimation result based on the first correction information and the second correction information;

updating the plurality of state values of the computer game based on the compensated estimation result to produce a plurality of updated state values; and automatically generating, based on the plurality of updated state values, a game screen that indicates the plurality of player characters are located in a second plurality of positions within the computer game space, wherein the game screen is displayed on a display device.

2. The nontransitory computer-readable medium according to claim 1, wherein, in response to the estimation result being compensated the plurality of state values are updated based on the estimation result that has been compensated for, the first correction information, or the second correction information.

3. The nontransitory computer-readable medium according to claim 1, wherein, in response to the estimation result being compensated, a first new estimation result is produced based on the estimation result that has been compensated for and the estimation model, and in response to the estimation result being not compensated, a second new estimation result is produced based on the estimation result that has not been compensated for and the estimation model.

4. The nontransitory computer-readable medium according to claim 1, wherein the per-timing information further indicates, in addition to the input content of the plurality of player inputs, at least one of a position of an operated object in the computer game space, a position of a non-operated object in the computer game space, a characteristic of the operated object, and a characteristic of the non-operated object.

5. The nontransitory computer-readable medium according to claim 1, wherein a plurality of estimation results are produced in the plurality of player terminals based on the same estimation model.

6. The nontransitory computer-readable medium according to claim 1,
wherein the matrix data indicates, as the input content of the plurality of player inputs corresponding to the plurality of player characters, a data point group at screen coordinates detected on a touchscreen of the player terminal.

7. The nontransitory computer-readable medium according to claim 1,
wherein the matrix data indicates, as the input content of the plurality of player inputs corresponding to the plurality of player characters, information obtained by encoding a vector calculated from a data point group at screen coordinates detected on a touchscreen of the player terminal.

8. The nontransitory computer-readable medium according to claim 1,
wherein the matrix data indicates a state of the world coordinate system in which information indicating the input content of the plurality of player inputs corresponding to the plurality of player characters is associated with and mapped to the first plurality of positions of the plurality of player characters.

9. The nontransitory computer-readable medium according to claim 1,
wherein the estimation model is generated through machine learning based on learning data that is extracted from tensor data storing the matrix data along a time axis and in which the matrix data corresponding to an N-th timing is associated with the matrix data corresponding to a timing after the N-th timing.

10. The nontransitory computer-readable medium according to claim 9,
wherein the estimation model is generated through the machine learning based on the learning data that is extracted from the tensor data storing the matrix data along the time axis and in which the matrix data corresponding to the N-th timing is associated with each of the matrix data corresponding to timings from an (N+1)-th timing to an (N+K)-th timing, where K is an integer equal to or larger than 2.

11. A server comprising:
a processor;
a memory connected to the processor, wherein the memory comprises program instructions configured to perform a method comprising:
obtaining a plurality of game logs comprising a plurality of state values of a plurality of player characters that are controlled in a computer game space by a plurality of player terminals over a communication network;
generating, based on the plurality of game logs and at intervals of a predetermined time period, matrix data indicating a state of a world coordinate system in which a data point group indicating touch positions at screen coordinates detected on a touchscreen of each of a plurality of player terminals in such a manner as to correspond to a plurality of timings at intervals of the predetermined time period is associated with and mapped to a plurality of positions of the plurality of player characters;
generating tensor data storing the matrix data along a time axis;
extracting, from the tensor data, learning data in which the matrix data corresponding to an N-th timing is associated with the matrix data corresponding to a timing after the N-th timing; and
generating, using a learn function, a machine learning model, and based on the learning data, an estimation model;
determining an estimation result using the estimation model and from the matrix data corresponding to a certain timing,
wherein the estimation model produces the estimation result for a second timing based on per-timing information regarding a plurality of player inputs for the plurality of player characters that are accepted by the plurality of player terminals for a first timing,
wherein the per-timing information comprises the matrix data that has rows and columns corresponding to an x-axis and a y-axis in a world coordinate system of the computer game space and in which a value of a component at a q-th row and an r-th column indicates a state of coordinates $(X_q, V_r)$ in the world coordinate system,
wherein the matrix data indicates a first plurality of positions of the plurality of player characters in the computer game space and input content of the plurality of player inputs for the plurality of player characters,
determining a plurality of updated state values of a computer game based on the estimation result; and
automatically generating, based on the plurality of updated state values, a game screen that indicates the plurality of player characters are located in a second plurality of positions within the computer game space,
wherein the game screen is configured to be displayed on a display device on a player terminal.

12. The server according to claim 11, wherein the method further comprises:
extracting, from the tensor data, learning data in which the matrix data corresponding to the N-th timing is associated with each of the matrix data corresponding to timings from an (N+1)-th timing to an (N+K)-th timing, where K is an integer equal to or larger than 2.

13. The server according to claim 11,
wherein the matrix data indicates a state of a world coordinate system in which encode information, instead of the data point group, obtained by encoding a vector calculated from the data point group is associated with and mapped to the first plurality of positions of the plurality of player characters.

14. A processing method comprising:
storing a plurality of state values of a computer game corresponding to a plurality of player characters that are controlled in a computer game space by a plurality of player terminals over a communication network;
accepting a player input by an input device at a first timing for controlling a player character among the plurality of player characters within the computer game;
determining an estimation result corresponding to a second timing, which is later than the first timing, based on an estimation model,
wherein the estimation model produces the estimation result for the second timing based on per-timing information regarding a plurality of player inputs for the plurality of player characters that are accepted by the plurality of player terminals for the first timing,
wherein the per-timing information comprises matrix data that has rows and columns corresponding to an x-axis and a y-axis in a world coordinate system of the computer game space and in which a value of a component at a q-th row and an r-th column indicates a state of coordinates $(x_q, y_r)$ in the world coordinate system, wherein the matrix data indicates a first plurality of positions of the plurality of player characters in the computer game space and input content of the plurality of player inputs for the plurality of player characters, and wherein the estimation model is a machine learning model that is generated using a learn function and a plurality of game logs that are obtained by a server for a plurality of computer games;

determining whether accepted input content of the player input accepted by the input device for the second timing coincides with predicted input content of the player input that is indicated by the estimation result for the second timing;

transmitting, in response to a determination result indicating a non-coincidence of the accepted input content and the predicted input content for the second timing, first correction information indicating the accepted input content of the player input;

acquiring second correction information transmitted by another player terminal;

compensating for the estimation result to produce a compensated estimation result based on the first correction information and the second correction information;

updating the plurality of state values of the computer game based on the compensated estimation result to produce a plurality of updated state values; and automatically generating, based on the plurality of updated state values, a game screen that indicates the plurality of player characters are located in a second plurality of positions within the computer game space, wherein the game screen is displayed on a display device.

15. A processing system comprising:
a plurality of player terminals and a server,
wherein a respective player terminal among the plurality of player terminals comprises a first processor and a first memory, the respective player terminal being configured to perform a method comprising:

storing a plurality of state values of a computer game corresponding to a plurality of player characters that are controlled in a computer game space by the plurality of player terminals over a communication network;

accepting a player input by an input device at a first timing for controlling a player character among the plurality of player characters within the computer game;

determining an estimation result corresponding to a second timing, which is later than the first timing, based on an estimation model, wherein the estimation model produces the estimation result for the second timing based on per-timing information regarding a plurality of player inputs for the plurality of player characters that are accepted by the plurality of player terminals for the first timing, wherein the per-timing information comprises matrix data that has rows and columns corresponding to an x-axis and a y-axis in a world coordinate system of the computer game space and in which a value of a component at a q-th row and an r-th column indicates a state of coordinates (xq, yr) in the world coordinate system, wherein the matrix data indicates a first plurality of positions of the plurality of player characters in the computer game space and input content of the plurality of player inputs for the plurality of player characters, and wherein the estimation model is a machine learning model that is generated using a learn function and a plurality of game logs that are obtained by the server for a plurality of computer games;

determining whether accepted input content of the player input accepted by the input device for the second timing coincides with predicted input content of the player input that is indicated by the estimation result for the second timing;

transmitting, in response to a determination result indicating a non-coincidence of the accepted input content and the predicted input content for the second timing, first correction information indicating the accepted input content of the player input;

acquiring second correction information transmitted by another player terminal among the plurality of player terminals than the respective player terminal;

compensating for the estimation result to produce a compensated estimation result based on the first correction information and the second correction information;

updating the plurality of state values of the computer game based on the compensated estimation result to produce a plurality of updated state values; and automatically generating, based on the plurality of updated state values, a game screen that indicates the plurality of player characters are located in a second plurality of positions within the computer game space, wherein the game screen is displayed on a display device, and wherein the server comprises a second processor and a second memory, the server being configured to, upon receiving the first correction information from the respective player terminal among the plurality of player terminals, transmit the first correction information to the other player terminals among the plurality of player terminals.

16. The processing system according to claim 15, wherein the server is further configured to:

generate tensor data storing the matrix data along a time axis;

extract, from the tensor data, learning data in which the matrix data corresponding to an N-th timing is associated with the matrix data corresponding to a timing after the N-th timing; and generate, using a learn function, a machine learning model, and based on the learning data, an estimation model.

* * * * *